United States Patent
Canning et al.

(10) Patent No.: US 7,349,427 B1
(45) Date of Patent: Mar. 25, 2008

(54) ROUTING METHOD AND APPARATUS FOR OPTIMISING AUTO-TUNNELLING IN A HETEROGENEOUS NETWORK

(75) Inventors: Terence Canning, Belfast (GB); Derek Gilmore, Antrim (GB); Allen Houston, Antrim (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 954 days.

(21) Appl. No.: 10/225,541

(22) Filed: Aug. 21, 2002

Related U.S. Application Data

(63) Continuation-in-part of application No. 10/039,432, filed on Jan. 3, 2002, which is a continuation-in-part of application No. 10/032,417, filed on Dec. 21, 2001.

(51) Int. Cl.
*H04J 3/16* (2006.01)
(52) U.S. Cl. .................. 370/466; 370/467; 370/400
(58) Field of Classification Search ............. 370/466, 370/467, 400
See application file for complete search history.

(56) References Cited

U.S. PATENT DOCUMENTS

| | | | |
|---|---|---|---|
| 5,251,205 A | 10/1993 | Callon et al. | |
| 6,195,705 B1 * | 2/2001 | Leung | 709/245 |
| 7,099,323 B1 * | 8/2006 | Doong et al. | 370/390 |

FOREIGN PATENT DOCUMENTS

EP 1065848 1/2001

OTHER PUBLICATIONS

Dave Katz Juniper Networks et al "Traffic Engineering Extensions to OSPF" IETF Standard-Working-Draft Jun. 30, 2001.
Christian P et al "IS-IS Automatic Encapsulation . . . " XP015021579, Jul. 2002.
Callon Digital Equipment Corporation R "Use of OSI IS-IS for Routing in TCP/IP and Dual Environments . . . " XP015006139, Dec. 1990.

* cited by examiner

*Primary Examiner*—Huy D. Vu
*Assistant Examiner*—Jason Mattis
(74) *Attorney, Agent, or Firm*—Barnes & Thornburg LLP

(57) ABSTRACT

In the preferred embodiment, the invention provides a modified Shortest Path First routing algorithm for use in a heterogeneous network. The routing algorithm is modified to include predetermined heterogeneous characteristics of the network nodes and to take these characteristics into account when calculating the shortest paths. For example, information may be included in the algorithm which identifies heterogeneous network nodes as it calculates shortest paths. Once a node has been identified as heterogeneous, i.e., capable of supporting at least two protocol sets, this information is carried over into subsequent path entries created by the routing algorithm. The algorithm then uses the encapsulation capability identifier in the calculation of the shortest paths by including the cost of auto-tunneling between heterogeneous nodes to be taken into account when determining the short path.

20 Claims, 31 Drawing Sheets

PATHS DATABASE

<SELF,0,(W,[B])>
<3,2,(3-0,[B])>
<2,3,(2-0,[A])>
<4,4,(2-0,[A])>
<5,5,(2-0,[A])>
<6,6,(2-0,[A])>
<7,7,(2-0,[A])>
<8,8,(2-6,[B])>
<9,8,(2-0,[A])>
<10,9,(2-0,[A])>
<11,9,(2-9,[B])>

PROTOCOL B

| Destination Address | Adjacency/ Interface/Circuit | Dual Protocol Router |
|---|---|---|
| 3 | 3 | 0 |
| 4 | 2 | 4 |
| 5 | 2 | 5 |
| 6 | 2 | 5 |
| 8 | 2 | 6 |
| 9 | 2 | 9 |
| 11 | 2 | 9 |

FIG.23A

PATHS DATABASE

<SELF,0,(W,[B])>
<3,2,(3-0,[B])>
<2,3,(2-0,[A])>
<4,5,{(2-0,[A]),(3-0,[B])}>
<5,6,{(2-0,[A]),(3-0,[B])}>
<6,7,{(2-0,[A]),(3-0,[B])}>
<7,8,(2-0,[A])>
<8,9,{(2-6,[B]),(3-0,[B])}>
<9,8,{(2-0,[A]),(3-0,[B])}>
<10,10,(2-0,[A])>
<11,10,(2-9,[B])>

PROTOCOL B

| Destination Address | Adjacency/ Interface/Circuit | Dual Protocol Router |
|---|---|---|
| 3 | 3 | 0 |
| 4 | 2 | 4 |
| 5 | 2 | 5 |
| 5 | 3 | 0 |
| 6 | 2 | 5 |
| 6 | 3 | 0 |
| 8 | 2 | 6 |
| 8 | 3 | 0 |
| 9 | 2 | 9 |
| 11 | 2 | 9 |

FIG.23B

ROUTING METHOD AND APPARATUS FOR OPTIMISING AUTO-TUNNELLING IN A HETEROGENEOUS NETWORK

RELATED APPLICATIONS

The present invention claims priority from and is a continuation in part of U.S. patent application Ser. No. 10/039,432, filed 3 Jan. 2002, entitled "IMPROVEMENTS IN AND RELATING TO AUTO-TUNNELLING IN A HETEROGENEOUS NETWORK", which is a continuation in part of U.S. patent application Ser. No. 10/032,417, filed 21 Dec. 2001 entitled "AUTO-TUNNELLING IN A HETEROGENEOUS NETWORK", copies of which are filed herewith and the disclosures of which are incorporated herein, in their entirety, by reference.

FIELD OF THE INVENTION

The present invention relates to a method of routing traffic optimally using autotunnelling in a heterogeneous network, and in particular but not exclusively to a method of determining an optimum path in a heterogeneous network having dual protocol, or bi-lingual, network elements.

BACKGROUND TO THE INVENTION

In a heterogeneous network, each network element, or node, may support one or more protocol sets. For example, a network element may support OSI (Open System Interconnect) protocols anchor IP (Internet protocols) protocols. In order that one network element may communicate with another network element, they must support at least one protocol set in common since different protocol sets do not interoperate. It is possible to send data packets, or traffic, conforming with one protocol set to a destination via one or more network elements that do not support the protocol set of the data by means of data tunnelling. Data tunnelling involves the encapsulation of one protocol set within another protocol set. For example, assume that it is desired to send IP data packets from a source network element that supports IP protocols to a destination network element that also supports IP protocols via a sub-network comprising network elements that only support OSI protocols. The IP data packets are encapsulated within OSI protocols for their passage through the OSI-only network elements and de-encapsulated afterwards. In order that data tunnelling may be achieved, at least some of the network elements between the source and the destination must be able to support both protocol sets. Such network elements are said to be bi-lingual.

PCT/EP01/14203, a copy of which is filed herewith, and which is incorporated by reference, discloses an autotunnelling scheme in a heterogeneous network in which bi-lingual network elements are arranged to create automatically and dynamically data tunnels in order to forward traffic across a heterogeneous network.

In order to learn about the network around it, and to calculate paths across the network to destination nodes, a network element usually runs a routing algorithm. Typically, the calculation of the routing algorithm is a computationally intensive operation and accounts for a significant proportion of the network elements processing time. The compilation of information concerning nearest bi-lingual network elements, as required by the aforementioned auto-tunnelling scheme, must be performed in addition to the normal tasks of the routing algorithm. U.S. patent application Ser. Nos. 10/039,432 and 10/032,417 disclose how such topology information can be efficiently compiled in order to reduce the computational burden and so improve the speed of operation of the network element.

It will be understood that the term "protocol" as used herein is intended to embrace protocol set, or protocol stack, where the set (or stack) may comprise one or more protocols. For example, OSI and IP may each be considered to comprise a respective set of protocols, but may be referred to herein as OSI protocol or IP protocol respectively.

The present invention relates particularly, but not exclusively, to OSI and IP protocols, and respective ISO (International Organisation for Standardisation) and IETF (Internet Engineering Task Force) standard describing these protocols may be obtained from the Internet.

A network element supports one or more routing protocols in order to route data traffic across a network. Integrated IS-IS (Intermediate System to Intermediate System) is a routing protocol that was devised as an extension to IS-IS routing protocol and, in conjunction with data tunnelling, allows network elements to route IP traffic as well as OSI traffic. Integrated IS-IS is described in IETF standard RFC 1195 IS-IS is described in ISO 10589.

IS-IS and Integrated IS-IS normally employ a routing algorithm know as SPF (Shortest Path First) in order to calculate the "shortest" path across a network from one node to another RFC 1195 and ISO 10589 are hereby incorporated herein by way of reference.

OSI traffic comprises OSI data packets, where OSI data packets conform with OSI protocol, particularly CLNP (ConnectionLess mode Network Protocol), CLNP being an OSI network layer protocol. CLNP is the name given to the type of data packets or PDUs (Protocol Data Units) that are used to provide CLNS (ConnectionLess mode Network Service). CLNS is the service provided by the network layer of an OSI protocol stack to higher layers of the stack. Provision of CLNS service results in CLNP packets or PDUs being passed to lower layers of the stack.

IP traffic comprises IP data packets, where IP data packets conform with IP protocol, particularly IPv4 and IPv6 which are IP network layer protocols.

An IP-only network element, or node, is a node that can natively route IP packets but not OSI packets. An OSI-only node is a node that can natively route OSI packets, but not IP packets. A dual, or bilingual, network element, or network node, is a node that can natively route at least two protocols, particularly network layer protocols. This term is used hereinafter particularly to indicate either a node that routes both CLNS/CLNP and IPv4, or alternatively a node that routes both IPv4 and IPv6.

Hereinafter, the term "network node" (or "node") is used in preference to "network element" to conform with the terminology favoured in International PCT patent application number PCT/EP01/14203, although either term may be used.

It will be understood that the term "router" as used hereinafter is intended to embrace a network element, or network node, (or part thereof) that is arranged to act as a data router. Hence, a "heterogeneous router" is a network node (or part thereof) that is capable of routing at least two protocol sets. It should be noted that the term "heterogeneous router" implies a multi-protocol router and is used here in preference to the term "dual router", which term is used to imply a multi-protocol router in U.S. patent application Ser. Nos. 10/039,432, and U.S. 10/032,417.

An adjacent network node ("adjacency") is a reachable neighbouring node. The term "adjacency" is defined in section 3.6.3 of ISO/IEC 10589 and is used herein to denote a reachable neighbouring node. A physical neighbouring node is not necessarily a valid adjacency, since it might be in a different network area or network level. Thus, an adjacency may be maintained between nodes that are not physical neighbours.

U.S. patent application Ser. No. 10/039,432 describes a routing algorithm which determines the encapsulation capability of each router. Advantageously, by providing an indication of encapsulation capability, heterogeneous routers which do not in fact have encapsulation capability despite being able to support both protocols are no longer erroneously selected as termination points for auto-tunnelling. U.S. Ser. No. 10/038,432 describes the indication of the order of encapsulation by using a suitable encapsulation capability identifier to indicate, for example, whether OSI over IP is supported but not IP over OSI.

U.S. Pat. No. 5,251,205 (Callon et al) describes multiple protocol routing in which the Dijkstra algorithm is modified to generate information on how to encapsulate and forward packets through the network. However Callon et al do not consider how to modify the cost d(N) used in the routing algorithm if encapsulation is required to ensure that encapsulation requirements are considered when selecting the optimum path in a heterogeneous network. Nor do Callon et al include an additional field to determine the optimum heterogeneous router to ensure the minimum number of encapsulations occur along that path.

An object of the invention seeks to mitigate and or obviate the aforementioned problems known in the prior art by providing a routing method which calculates an optimum path using the cost of encapsulation. The optimum path is the 'shortest' path returned by a modified Dijkstra-type routing algorithm which at least includes the cost of encapsulation when determining the most efficient (in terms of assigned cost) path across a heterogeneous network.

Another object of the invention seeks to provide a method of determining an optimum path across a heterogeneous network which at least uses the cost of encapsulation between protocol sets.

SUMMARY OF THE INVENTION

A first aspect of the invention provides a method of determining an optimum path for data packets in a heterogeneous network from a first network node, the method comprising the step of calculating the optimum path using the cost of encapsulating data packets provided in accordance with a first protocol set in a second protocol set.

A second aspect of the invention provides a method of routing data packets in a heterogeneous network from a first network node, the method comprising the steps of creating entries in at least one database associated with said first network node, each entry relating to at least one respective path from said first network node to a respective destination node in the network; determining, when creating an entry, if a network node located along said at least one respective path is a heterogeneous network node; associating with each created entry, additional information comprising at least one heterogeneous characteristic of a said heterogeneous network node; creating subsequent entries in respect of paths to other network nodes; associating said additional information with said subsequent entries; and determining an optimum path along which said data packets can be routed in dependence on said additional information.

Advantageously, by associating the heterogeneous characteristics of the heterogeneous network nodes with their database entries, the heterogeneous characteristics can be incorporated into the routing algorithm, which enables optimum paths to be determined which reflect the encapsulation capabilities and the cost of encapsulation. For example, in the step of associating with each created entry, said at least one heterogeneous characteristic may comprise a characteristic of a first protocol set supported by said heterogeneous network node.

Preferably, at least one heterogeneous characteristic comprises an additional field for a transport protocol indicator (TPID field) in said at least one database.

Preferably, at least one heterogeneous characteristic comprises a metric cost for data encapsulating data packets provided in a form compliant with a first protocol set into a form compliant with a second protocol set. The metric cost may, for example, comprise a tunnelling metric (T).

Preferably, at least one heterogeneous characteristic comprises an indicator that terminating tunnelling at said heterogeneous network node provides the least number of encapsulations along said at least one respective path.

Preferably, at least one heterogeneous characteristic comprises the encapsulation capability of the heterogeneous network node between a first protocol set and a second protocol set.

Preferably, at least one heterogeneous characteristic identifies a heterogeneous network node as an optimum heterogeneous network node providing the lowest number of encapsulations/de-encapsulations along said at least one path to the destination node.

The at least one databases associated with the first network node may comprise:
  a first database for holding entries in respect of tentative paths to network nodes; and
  a second database for holding entries in respect of shortest paths to network nodes, and
  the method according to the first aspect of the invention may further comprise the steps of: deriving at least some of the entries in said second database from respective entries in said first database, wherein at least one heterogeneous characteristic indicates the cost of sending a data packet from the first node to the destination node of the entry, and creating an entry in said second database in respect of the entry in the first database having the lowest cost indicator.

The at least two databases associated with the first network node may comprise a first database for holding entries in respect of tentative paths to network nodes and a second database for holding entries in respect of shortest paths to network nodes, and the method according to the first aspect of the invention may further comprise the steps of: deriving at least some of the entries in said second database from respective entries in said first database, wherein the additional information associated with each entry in said first database comprises an indication of the cost of sending a data packet from the first node to the destination node of the entry in accordance with a first protocol, and
  creating an entry in said second database in respect of each entry in said first database having additional information indicating a different protocol set but having the same cost indicator.

The at least one database associated with the first network node may comprise a first database for holding entries in respect of tentative paths to network nodes, and a second database for holding entries in respect of shortest paths to network nodes, and the method according to the first aspect may further comprise the steps of:

deriving at least some of the entries in said second database from respective entries in said first database, wherein the additional information associate with each entry in said first database comprises an indication of the cost of sending a data packet from the first node to the destination node of the entry in accordance with a first protocol, and discarding an entry in said first database if its cost exceeds the tunnelling cost T where at least one other entry exists to the same destination with the same protocol prior to including this entry in the second database.

Preferably, each database entry in said at least one database relating to at least one path to a destination node includes, in respect of the, or each path, a respective multi-protocol field for carrying said identifying information, wherein the, or each, multi-protocol field may be set to identify a heterogeneous router in the respective path, or to indicate that no known heterogeneous router exists in said respective path.

Preferably, when creating an entry in said first database in respect of at least one path to a destination node, the apparatus is arranged to determine if the destination node is a heterogeneous network node supporting at least two protocol sets only it at least one of the, or each, multi-protocol field is set to indicate that no other known heterogeneous network node exists in the respective path.

Preferably, whereupon determining that said destination node supports is a heterogeneous network node supporting at least two protocol sets, the apparatus is arranged to set the respective multi-protocol field to identify said destination node.

A third aspect of the invention provides a method of routing data packets in a heterogeneous network from a first network node, the method comprising the steps of: creating entries in at least one database associated with said first network node, each entry relating to at least one respective path from said first network node to a respective destination node in the network; determining, when creating an entry, if a network node located along said at least one path is a heterogeneous network node; associating with each heterogeneous network node an entry identifying at least one characteristic of said heterogeneous network node; creating subsequent entries in respect of paths to other network nodes; associating said heterogeneous characteristic information with said subsequent entries; determining an optimum path along which said data packets can be routed in dependence on said heterogeneous characteristic information, wherein at least one characteristic of said heterogeneous network node indicates an encapsulation cost for encapsulating data packets provided in accordance with a first protocol set into a second protocol set.

Preferably, the encapsulation cost is predetermined for each heterogeneous node in the network.

For example, the encapsulation cost for each heterogeneous node in the network can be made dependent on the capacity of the node for routing traffic provided in accordance with said second protocol set. The encapsulation cost may be equivalent to the do-encapsulation cost between said first protocol set and said second protocol set alternatively, the encapsulation cost may differ from the de-encapsulation cost. It is also possible to provide set the encapsulation cost to a negative value. The encapsulation cost may be varied according to network conditions. Advantageously, by appropriately setting the encapsulation cost, including providing a negative encapsulation cost, the use of tunnelling when determining an optimum path can be controlled. It is possible to set the encapsulation cost to automatically perform tunnelling without incurring the delay of fully calculating a route to the destination node. This is advantageous if a packet can avoid congestion, for example, if its native protocol is subject to a lot of congestion, by tunnelling in which case by choosing an appropriate value of T, for example, by setting T to a negative value, it is possible to increase the likelihood of tunnelling over the network.

A fourth aspect of the invention provides apparatus arranged to implement a method of routing data packets in a heterogeneous network from a first network node, the apparatus comprising: means arranged to create entries in at least one database associated with said first network node, each entry relating to at least one respective path from said first network node to a respective destination node in the network; means arranged to determine, when creating an entry, if a network node located along said at least one path is a heterogeneous network node; means arranged to associate with each heterogeneous network node an entry identifying at least one characteristic of said heterogeneous network node; means arranged to create subsequent entries in respect of paths to other network nodes; and means arranged to associate said heterogeneous characteristic information with said subsequent entries by determining an optimum path along which said data packets can be routed in dependence on said heterogeneous characteristic information, wherein at least one characteristic of said heterogeneous network node indicates an encapsulation cost for encapsulating data packets providing in accordance with a first protocol set into a second protocol set.

Preferably, the characteristic information identifies a optimum heterogeneous router providing the least number of encapsulations/de-encapsulations of data packets along said at least one path to the destination node.

The first network node preferably includes a first database for holding entries in respect of tentative paths to network nodes, and a second database for holding entries in respect of shortest paths to network nodes, and the apparatus is preferably arranged to derive at least some of the entries in said second database from respective entries in said first database, and to derive at least some of the entries in said second database from respective entries in said first database.

Advantageously, the apparatus can be arranged to determine if a network node is a heterogeneous network node supporting at least two protocol sets when creating an entry in said second database, and to associate said identifying information with the, or each, entry in the first database which is subsequently derived from said entry in the second database. For example, the two protocol sets may comprise the OSI protocol set and the IP protocol set.

Advantageously, the apparatus can be arranged to determine the encapsulation capability of said network nodes in respect of said first and second protocol sets when creating an entry in said second database, and to associate said identifying information which the, or each, entry in the first database, and to associate said identifying information with the, or each, entry in the first database which is subsequently derived from said entry in the second database. Advantageously, the apparatus can be arranged to associate said identifying information with one or more subsequent entries in said second database derived from the, or each, of said first database entries. Preferably, in respect of an entry added to said second database, the apparatus is arranged to create selectively a respective entry in said first database in respect of at least one path to the, or each, network node that is adjacent the destination node to which said added second database entry relates. Advantageously, it is possible for each entry to include an indicator of the cost of sending a data packet from the first node to the destination node of the entry, the apparatus being arranged to create an entry in said second database in respect of the entry in the first database having the lowest cost indicator. Advantageously, the apparatus can be arranged to include said identifying information in each relevant database entry.

Advantageously, it is possible for each database entry relating to at least one path to a destination node to include, in respect of the, or each path, a respective multi-protocol field for carrying said identifying information, wherein the, or each, multi-protocol field may be set to identify a heterogeneous router in the respective path, or to indicate that no known heterogeneous router exists in said respective path. Furthermore, when creating an entry in respect of at least one path to a destination node, the apparatus can be advantageously arranged to determine if the destination node supports at least two protocol sets only if at least one of the, or each, multi-protocol field is set to indicate that no known heterogeneous router exists in the respective path, Advantageously, whereupon determining that said destination node supports at least two protocol sets, the apparatus can be arranged to set the respective multi-protocol field to identify said destination node as a heterogeneous network node. Advantageously, each of said entries can further include at least one adjacent node field for identifying which adjacent node of said first node is the first node in said path to the destination node, and wherein the, or each, adjacent node field is associated with a respective multi-protocol field.

Advantageously, it is possible for the network nodes to be arranged to implement one or more Link State Protocols and wherein said first network node includes a third database for storing routing data packets that are distributed by each other network node in accordance with the, or each, Link State Protocol, and for the apparatus to be arranged to examine the respective routing data packet issued by a destination node in order to determine the protocol sets supported by said destination node supports. The network nodes that support at least two protocol sets can be arranged to support the Integrated IS-IS Link State Protocol. The apparatus can be arranged to examine the "protocols supported" field of the respective routing data packets, and/or to examine the "encapsulation capability" field of the respective routing data packets.

A fifth aspect of the invention provides a network node comprising an apparatus according to the third aspect of the invention.

A sixth aspect of the invention provides a heterogeneous network comprising one or more network nodes comprising an apparatus according to the fourth aspect of the invention.

A seventh aspect of the invention provides a method of identifying heterogeneous routers in an apparatus according to the first or second aspect of the invention.

A eighth aspect of the invention provides a computer program product comprising computer useable instructions for causing a computer to implement the method according to the first, second, third, or seventh aspect of the invention.

U.S. patent application Ser. Nos. 10/039,432, and 10/032,417 calculate an optimum path through the network in which links are selected if they collectively provide the lowest total metric. Advantageously, the present invention modifies the link metrics to take into account the cost of auto-tunnelling between two nodes along a path. This enables the cost of auto-tunnelling to be assessed on a node-by-node basis when determining the shortest path, so that the shortest path selected by the modified algorithm in accordance with the invention takes into account the cost of the links and the cost of autotunnelling to determine the total route cost. The routing algorithm thus ensures that encapsulation and de-encapsulation occur at multi-protocol routers having the appropriate de/encapsulation capabilities along the route, and selects these routers to minimise the total route cost and to ensure a more optimum shortest path is selected by the routing algorithm.

Advantageously, the invention enables the optimum heterogeneous router, i.e., the router which ensures the minimum number of encapsulations to be identified. An optimum heterogeneous router is a multi-protocol router supporting at least two protocols, at least one of which may be tunnelling inside the other, which provides the lowest number of encapsulations.

Advantageously, the invention enables the cost of tunnelling to be incorporated into the routing algorithm in the determination of the shortest path. The algorithm is run separately for each protocol subject to auto-tunnelling in the heterogeneous network in the preferred mode of the invention presently contemplated by the inventors, however, in certain embodiments it may be desirable to designate a subset of the protocols for which the routing algorithm is run to reduce processing number. Moreover, it is possible to simultaneously execute the routing algorithm for each protocol albeit at the disadvantage of requiring additional processing power.

Other advantageous aspects and features of the invention will be apparent to those ordinarily skilled in the art upon review of the following description of a specific embodiment of the invention and with reference to the accompanying drawings.

The preferred features and advantageous as described herein above or as described by the dependent claims filed herewith may be combined as appropriate, and may be combined with any of the aspects of the invention as described herein above or by the independent claims filed herewith, as would be apparent to those skilled in the art.

BRIEF DESCRIPTION OF THE DRAWINGS

An embodiment of the invention is now described by way of example and with reference to the accompanying drawings in which:

FIGS. 23A and 23B shows the final paths database entries and routing table for protocol B in an alternative embodiment of the invention.

DETAILED DESCRIPTION OF THE DRAWINGS

Figure 1A:
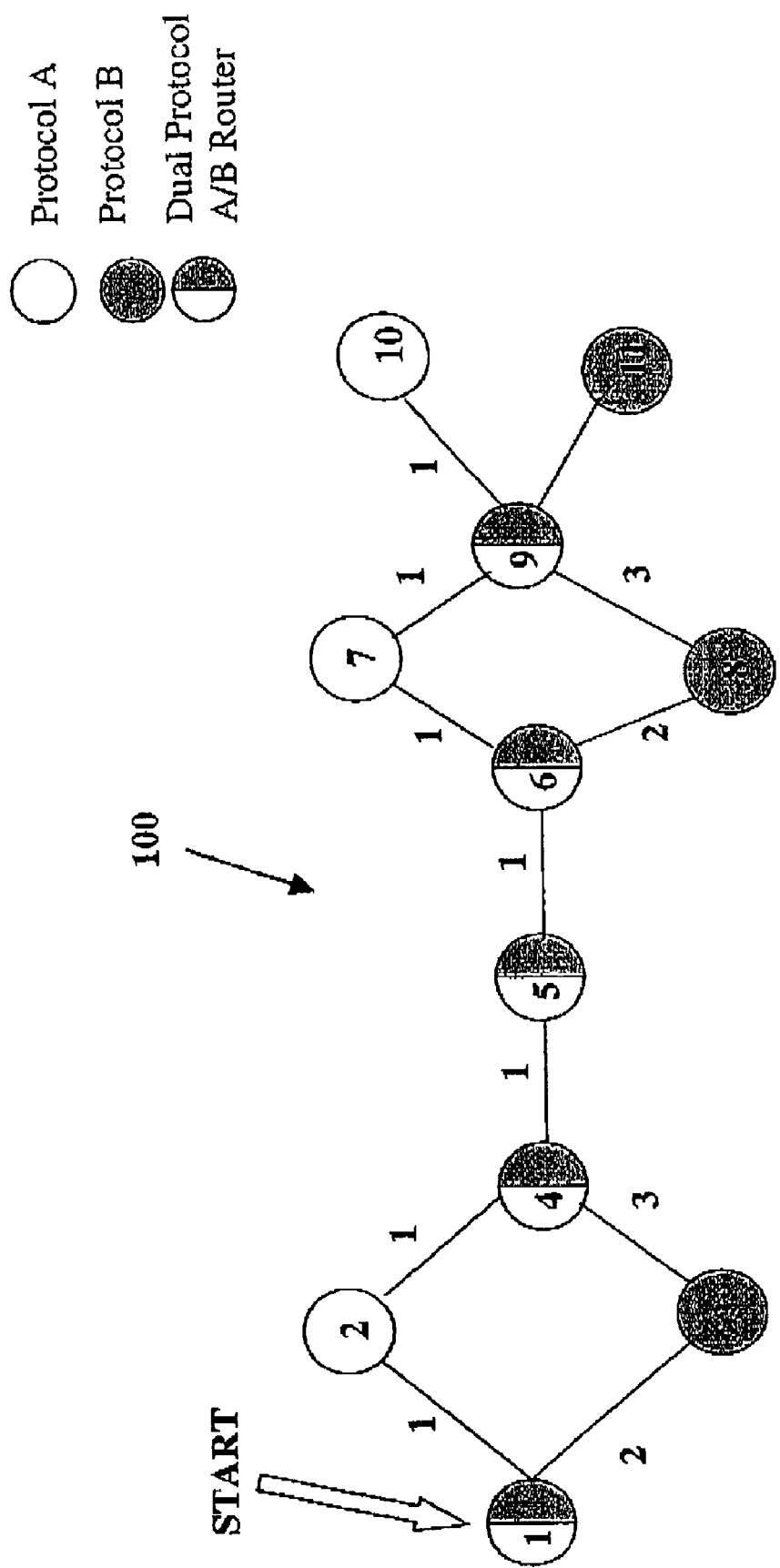
FIG. 1A is a schematic diagram of a heterogeneous network comprising a plurality of network nodes.
Figure 1B:
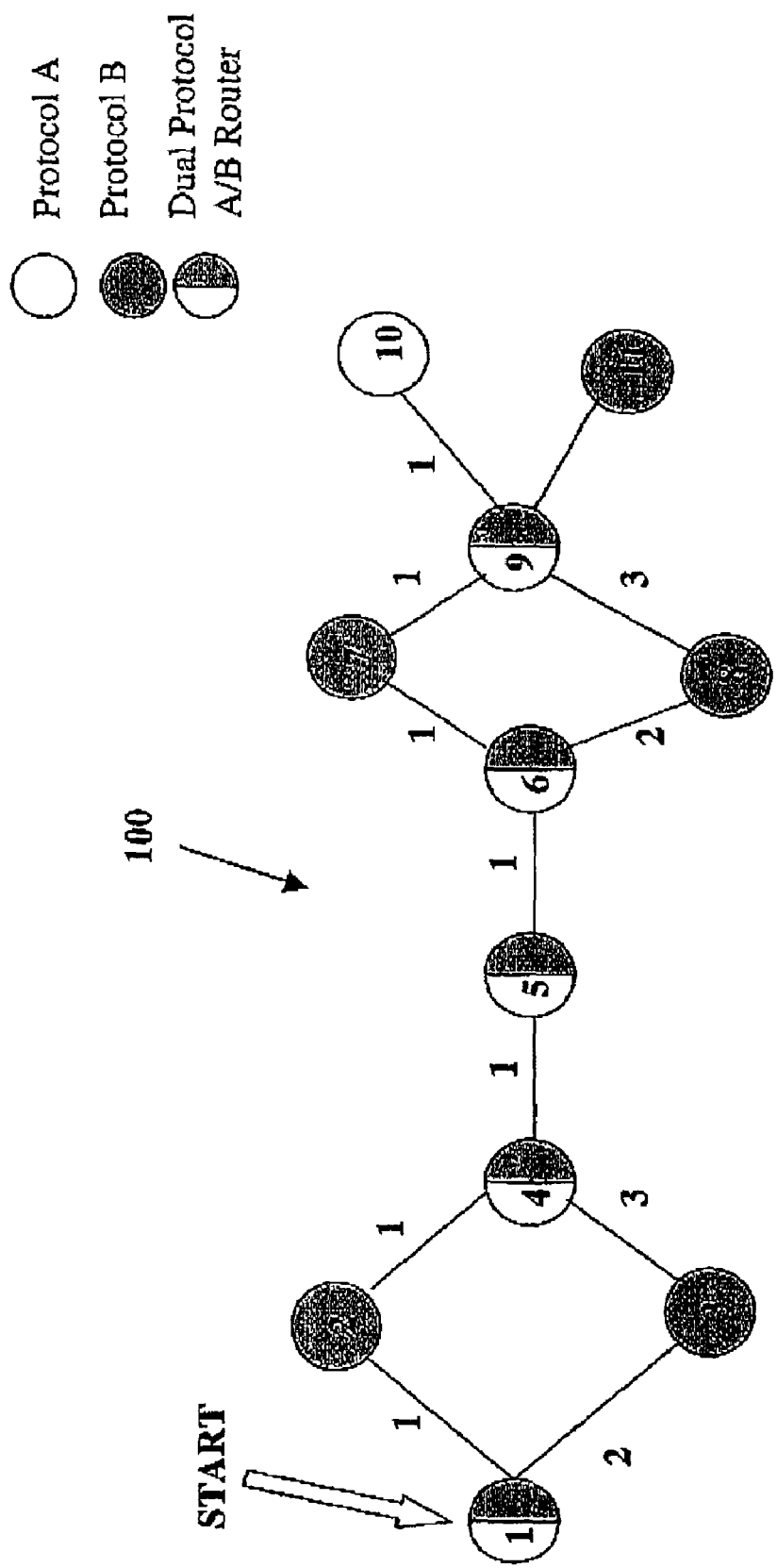
FIG. 1B shows an alternative network scenario according to another embodiment of the invention.

Referring firstly to FIGS. 1A and 1B, there is shown a network 100, or routing domain, comprising a plurality of network nodes, or network elements (1-11_. The network nodes 1-11, which may also be referred to as systems (e.g. Intermediate System), are arranged to route data packets (not shown) across the network 100.

Each network node 1-11 may comprise one or more piece of network equipment, for example, such as a multiplexer or a cross-connect, and further comprises routing apparatus to enable it to route data packets across the network 100. Since the present invention relates particularly to the routing of data packets, the nodes (1-11), and in particular the routing apparatus included in the nodes, may be referred to herein as routers. The nodes collectively form at least one network area, preferably, for example, at least one level 1 IS-IS network area, or alternatively a level 2 subdomain.

Heterogeneous Network Characteristics

FIGS. 1A and 1B show embodiments of the invention for illustrative purposes which assumes network 100 is a level 1 network area, and network 100 consists of IS (Intermediate System) nodes 1 to 11. In FIGS. 1A and 1B, network 100 is heterogeneous, as not all nodes in network 100 support a common protocol, for example a network layer protocol such as CLNP (see ISO 8473-4), IPv4 (see RFC 791) or IPv6 (see RFC 2460). In FIGS. 1A and 1B, for example, the heterogeneous network supports two protocols "A" and "B", multi-protocol nodes are indicated as dual-protocol routers, and nodes supporting only a subset of the multiple protocols support either protocol "A" or protocol "B".

In the embodiment shown in FIG. 1A, nodes 2, 7 and 10 are standard IS-IS or Integrated IS-IS routers running a first protocol, protocol A, where A may be any of, for example, CLNS/CLNP, IPv4, IPv6 or any other protocol that is routable using IS-IS or Integrated IS-IS.

It is further assumed that nodes 3, 8 and 11 are standard IS-IS or Integrated IS-IS routers running a second protocol, protocol B, where B may be a different protocol of CLNS/CLNP, IPv4, IPv6 or any other protocol that is mutable using IS-IS or Integrated IS-IS.

Nodes 1, 4, 5, 6 and 9 are assumed to be heterogeneous nodes or routers capable of supporting protocols A and B which run Integrated IS-IS and which are capable of encapsulating and de-encapsulating protocol A into protocol B and vice versa. For consistency with U.S. patent application Ser. Nos. 10/039,432 and 10/032,417, the term heterogeneous router is equivalent to the term dual router and indicates that at least two protocols are supported by the router.

The ability to support two or more protocols does not necessarily indicate that encapsulation between any of the protocols is also possible. Moreover, it is possible for a dual protocol router to have the ability to encapsulate from a first protocol to a second, but not have the ability to de-encapsulate from the second protocol to the first protocol, nor the ability to encapsulate the second to the first etc. In the embodiment discussed in more detail below, however, unless explicitly stated otherwise it is assumed that the term "heterogeneous router" (or its equivalent "dual router" when two protocols are being considered), indicates a router able to support at least two protocol sets, and having the ability to symmetrically encapsulate and de-encapsulate between the supported protocol sets.

Each of the dual routers 1, 4, 5, 6, 9 is arranged to run a shortest path first (SPF) routing algorithm in order to determine the "shortest" path (typically "shortest" is measured in terms of cost, distance or other metric) across the network 100 to another node. The conventional SPF algorithm is defined in Annex C of RFC 1195, which can be found on the Internet Engineering Task Force (IETF) web-site, www.ietf.org.

Heterogeneous Node Functions

Figure 2:
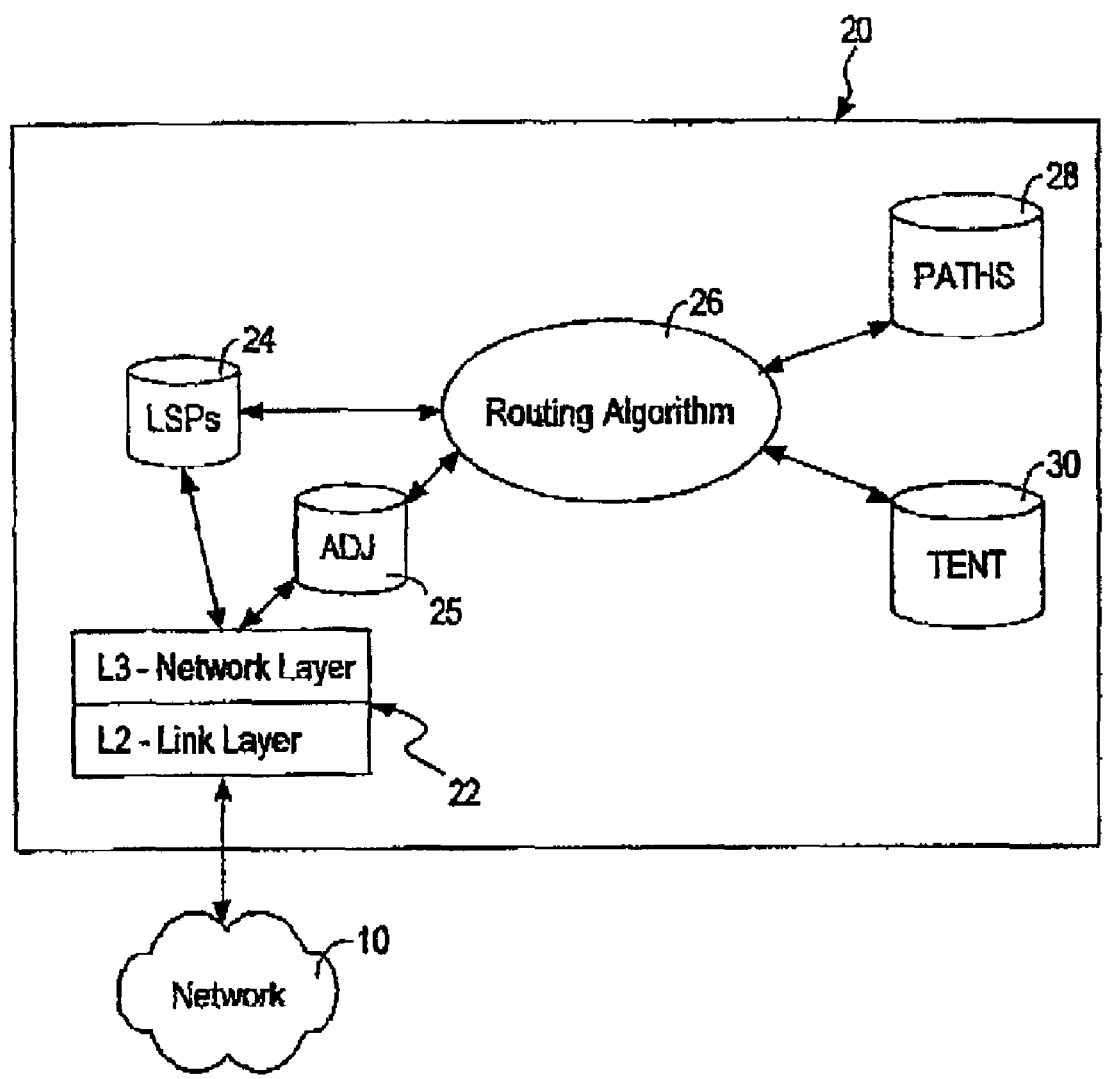
FIG. 2 is a schematic view of part of a network node, connected to the network of FIG. 1.
Figure 3:
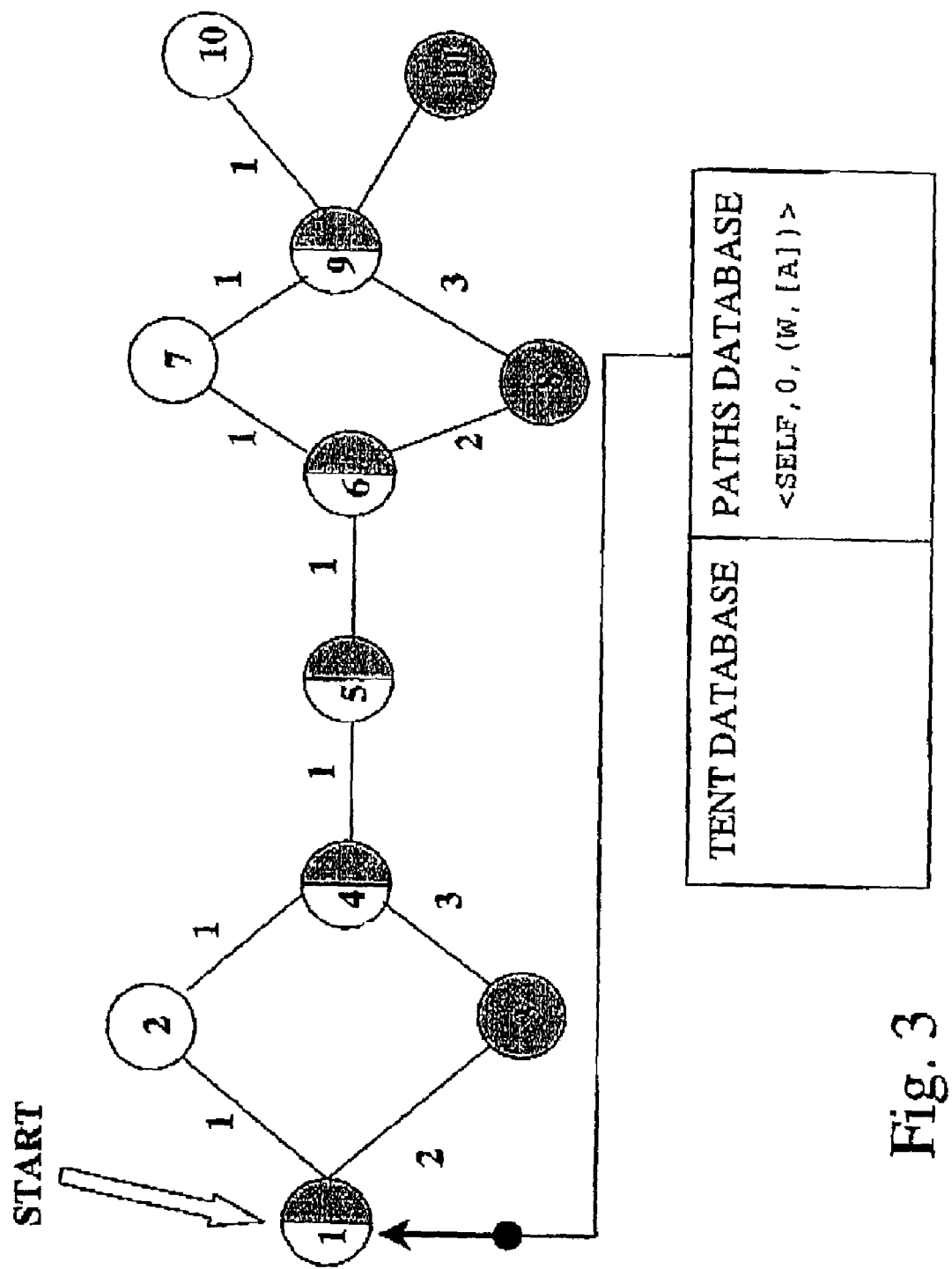
FIGS. 3 to 18 show successive representations of a first database, TENT, and a second database, PATHS, as they are populated during a worked example of a preferred embodiment of the invention for a first protocol ("A")

FIG. 2 shows a simplistic schematic view of a network element, or node 20, connected to network 100. For reasons of clarity, only those components of the node 20 that are necessary for understanding the invention are shown. The node 20 communicates with the network 100 via the Network Layer (L3) and Link Layer (L2) of a conventional protocol stack 22 (only L2 and L3 of the stack 22 are shown in FIG. 2). The stack 22 may be, for example, an OSI stack or an IP stack. A dual router includes at least two protocol stacks, one for each supported protocol, although this is not shown in FIG. 2 for reasons of clarity.

In accordance with IS-IS and Integrated IS-IS routing protocols, each router 1-11 in the network 100 creates routing data packets containing information about itself and causes these to be distributed to the other routers in the network 100. The routing data packets are normally referred to as Link State PDUs (LSPs), where PDU stands for Protocol Data Unit. Protocol Data Unit is an OSI term for data packet. Thus, LSP is sometimes used as an acronym for Link State Packet. The LSPs carry information about the node, or router, that issued them. This information includes identification of the, or each, other node in the network that is an adjacency to the issuing node, and an indication of cost, or metric. Integrated IS-IS LSPs also carry information identifying the, or each, protocol supported by the issuing node (this information is carried in a "protocols supported" field of the LSP). For example, in network 100, router 1 issues LSPs which identify routers 2 and 3 as its adjacencies and also indicates that router 1 supports both protocols A and B.

The node 20 gathers LSPs in respect of all other nodes in the routing domain (network 100) in conventional manner. The received LSPs are stored in a database, or other suitable memory structure, commonly known as an LSP database 24. The information stored in the LSP database 24 enables the node 20 to determine the topography of the network 100 of which it is part. This in turn allows the node 20 to calculate the shortest path to each other node in the network 100. To this end, the node 20 is arranged to run a routing algorithm 26 which, in the preferred embodiment, comprises a shortest path first (SPF) routing algorithm which consists of a modified routing algorithm described in more detail hereinbelow. The node 20 further includes a conventional Adjacency database 25 for storing information identifying the, or each, adjacency of the node 20. This information is conveniently compiled in normal manner by inspecting routing data packets that are received by the node 20 from its neighbours.

In accordance with RFC 1195, the modified SPF algorithm performs its calculations in association with a first database 28, or other memory structure, known as PATHS, and a second database 30, or other memory structure, known as TENT. PATHS can be considered as a directed graph of shortest paths, TENT holds the tentative placement of a system in PATHS. The LSP database 24, the PATHS database 28 and the TENT database 30 may be stored in one or more suitable conventional storage device (not shown).

The TENT database 30 includes one or more similar entries in respect of each reachable node in the network 100. However, entries in TENT 30 are not restricted to the shortest path. In simplistic view, the SPF algorithm calculates all possible paths to each destination node and places a corresponding entry in TENT 30 for each path. Then, the SPF algorithm determines which of these entries in TENT corresponds to the "shortest" path (normally by conducting a cost, or other metric, comparison). The entry for the shortest path to each destination node is then placed in PATHS 28. Within the operation of IS-IS and integrated IS-IS routing protocols, the most CPU-intensive operation is normally the calculation of the SPF algorithm in order to populate the TENT 30 and PATHS 28 databases.

The Modified Routing Algorithm

In order to implement the preferred embodiment of the present invention, certain modifications are made to a shortest path first (SPF) algorithm such as Dijkstra's algorithm. For example, co-pending U.S. patent application Ser. Nos. 10/039,432, and 10/032,417 describe how the routing algorithm, and in particular the SPF routing algorithm, can be modified in order to compile the necessary information identifying the next dual router in the respective path to each other node in the network. More particularly, the SPF routing algorithm is modified to identify the next dual router in the respective path to each other IS node in the routing domain e.g. level 1 network area or level 2 sub-domain.

In contrast to U.S. patent application Ser. Nos. 10/039, 432, and 10/032,417 the present invention modifies the link metrics to take into account that where multiple protocols exist within a network and are capable of exchanging information, the link metric may not be sufficient to determine optimum paths to reachable addresses. The protocol of the invention is run for each designated protocol supported by the network, the designation indicating that autotunnelling between the designated protocols is supported.

Link Metric Modification

To modify the link metric, the SPF routing algorithm requires additional information representing the heterogeneous characteristics of the nodes in the heterogeneous network. For example, in respect of each reachable node in the network 100, PATHS 28 according to the preferred embodiment of the invention contains an entry specifying:

the destination address of the node to which the entry relates;

an indicator of the distance, link cost, or link metric, of sending a data packet to the node at the destination address along the shortest path as calculated by the SPF algorithm the indicator including the cost of autotunnelling the data packet where required when the data packet is to be encapsulated within a supported protocol along the link between the node to the node at the destination address;

additional information comprising at least one other heterogeneous characteristic of the reachable node, such as a transport protocol identifier (TPID), and/or information indicating if the reachable node is an optimum heterogeneous router; and identification of the adjacency which serves as the beginning, or next hop, in said shortest path.

An optimum heterogeneous router may be defined as the router providing the minimal number of encapsulations/de-encapsulations along the optimum route which have been determined using the transport protocol identifying field (TPID field). For example, referring now to FIG. 1B, which differs from FIG. 1A in that routers 2 and 7 are nodes supporting protocol B only, if a packet in protocol A is to be routed through from router 1 to router 10, the present invention identifies the optimum dual router as node 9, and not any of the other dual routers 4, 5, or 6, as this results in the lowest number of encapsulations.

The optimum dual router is identified as the last router along the path held in the TENTS database which requires its TPID field to be reset back to the original TPID value. For example, referring back to FIG. 1B, router 1 supports protocol A, thus the initial TPID field is set to a value representative of protocol A. Router 2 (or equivalently router 3) supports only protocol B, the entry in the tents database for this router requires its TPID field value to be set to represent protocol B. Routers 4,5,6, and 7 (or equivalently 8) all support protocol B, and thus no change is made to the value of the TPID field. However, router 10 supports protocol A and does not support protocol B, and thus the TPID field in router 9 needs to be reset to a protocol which is supported by router 10. By resetting the TPID field to its original value in router 9, router 9 can be identified as the optimum router in terms of supporting the minimum number of encapsulations along the optimum path from router 1 to router 10.

The additional information can be provided by including two additional fields in the PATHS and TENTS database structures. For example, one additional field to indicate the transport protocol identifier (TPID), and another additional field, which may be referred to as the multi-protocol field (or heterogeneous characteristic field (or equivalently dual protocol field), in that it indicates at least two protocols can be supported by the router), can be added to the PATHS 28 database for storing an identifier of the heterogeneous router, which may not be the next, or nearest, heterogeneous router in the shortest path to the destination node.

The additional information may be provided by modifying the structure (as defined in RFC 1195) of entries (also known as "triples" or elements) in PATHS 28 to include an additional field, so that the resulting entry takes the following form:

$$<N,d(N),\{Adj(N)-DP(N),[TPID]\}>$$

where

N is a destination node identifier, the value of which specifies the destination address (typically in the form of a System ID (SID));

d(N) is a cost, or metric, indicator, the value of which specifies the distance or cost from the parent system, or node, SELF (i.e. the node performing the SPF calculations); and {Adj(N)–DP(N), [TPID]} is a set of node identifier triplets, wherein the value of Adj(N) specifies the address, or System ID, of the adjacency that is the next hop on the shortest path to the node at N, and the value of DP(N) specifies the address, or System ID, of the heterogeneous router on said shortest path, where TPID is the transport Protocol ID, identifying the protocol which was used to transport a packet from a source node S to a destination node N.

{Adj(N)–DP(N),[TPID]} is shown as a set of address pairs since it is possible to have more than one shortest path to a destination node (where two paths share the same cost) and it is convenient that respective values of Adj(N), DP(N), and [TPID] for each path are associated with one another. Thus {Adj(N)–DP(N),[TPID]} may be said to be the set of valid adjacencies that the parent system SELF may use to forward a data packet to node N, together with a corresponding DP(N) entry representing the System ID of the first, or next, dual router on the path from SELF to node N for a respective protocol TPID.

If the value of DP(N) is set to a null indicator, e.g. zero, or any other suitable indicator, this indicates that no known dual router exists on the path to the destination. The dual protocol field, DP(N) has a format which differs from the standard format described in RFC 1195. When the PATHS database 28 is completed by the SPF algorithm it contains a respective entry of the form described above for each reachable node, or system, in the routing domain.

Conveniently, entries in TENT 30 take a form similar to that shown above for PATH entries except, in this case, the, or each, Adj(N)–DP(N),[TPID] pair do not necessarily relate to the shortest path to the destination node N for the protocol [TPID].

By including the additional information, an autotunneling metric is added to the link metric to reflect the cost of autotunnelling between two nodes. This auto-tunnelling metric may be fixed for a network or may be determined for specific nodes. The auto-tunnelling metric enables the optimum path which is selected to be dependent on between which dual routers auto-tunnelling takes place.

By providing at least one additional variable which indicates an encapsulation/de-encapsulation cost, the route from a source node to a destination node in a heterogeneous network determined as the optimum path (in terms of cost, i.e., the shortest path returned by the shortest path first routing algorithm) has the least number of encapsulation/de-encapsulations. This enables routes to be retained in their native protocol format (for example, automatically) whenever possible thus avoiding the "cost" of autotunnelling.

The PATHS and TENTS databases can thus include additional information to indicate the next "tunnel termination point" along a path, and include an indication as to the suitability of the tunnel termination point selected regarding its tunnelling capabilities. The databases can thus provide information to the routing algorithm to enable the routing algorithm to determine whether a tunnel termination point having suitable tunnelling capabilities is an optimum tunnel termination point as well as information which enables the routing algorithm to determine whether terminating the tunnelling at that point is preferable in terms of cost. This enables a packet to be routed along a path and undergo only a minimum number of encapsulations de-encapsulations.

Route Determination

Further details of a preferred embodiment of the invention comprising a routing process in which a shortest path first (SPF) algorithm (for example, Dijkstra's Algorithm) is modified shall now be described as follows: — i) Firstly, the SPF algorithm is run for each designated protocol supported by the router, assume for this example PROTOCOL A;

ii) Secondly, the routing entry to a destination that is stored in either a tentative (TENTS) or actual routing database (PATHS) is modified to include an additional field, termed the TPID (Transport Protocol ID) field.

If the data being routed from the source is provided in a protocol which is a protocol supported by the router, the TPID field for that router is set to a first value reflecting this, and if the router does not support the protocol of the data, this is reflected by setting the TPID field to a different value. For example, in a heterogeneous network where data may take one of two protocols, and the routers within the network support either one or both of said two protocols, the TPID value may be either "1" where data requires encapsulation or if not encapsulated the TPID value may be set to 0. If the network is one where more than two protocols are designated, the range of values TPID may reflect this—i.e., if protocols A, B, and C are supported, the TPID value may reflect the protocol the data is provided, e.g., "TPID"=A, where data is provided in the form of protocol "A", and if de/encapsulation is supported, then the "TPID" is set to "B" or "C" as appropriate or to a default value if both B and C are supported.

The TPID field indicates when encapsulation is required to cross between routing domains to be taken into account whenever a path crosses a gateway router which supports more than one protocol. In this context, a routing domain is where one or more interconnected routers along a path support a single common protocol.

iii) A particular cost is assigned to represent when encapsulation/de-encapsulation takes place, by using an "autotunnelling" metric T, which can be user configurable. For example, in the case where a network supports two protocols A and B, T represents the cost to encapsulate/de-encapsulate protocol A within protocol B or vice versa. However, as has already been discussed above, it is possible for T to be dependent on which protocol is being tunnelled into which protocol, i.e., if protocol A is to be tunnelled into protocol B, the cost may be different from when protocol A is tunnelled into protocol C, or if protocol B needs to be tunnelled into protocol A etc.

iv) The routing process commences with running the algorithm and loading the adjacencies into the tentative routing database TENT (the same step as in the earlier embodiments of the invention). However, if an adjacency does not support the protocol A, then the TPID for this entry in TENT is set to 1 and the metric for this entry's adjacency is incremented by the value T.

v) If an entry D is added to the TENT database which is capable of encapsulating/de-encapsulating packets of protocol A in protocol B and a route to D already exists in TENTS, then the TPID values of these entries are checked. It the TPID values are the same, the entry with the highest metric is discarded. If the TPID values are different, then the difference between the metric of each entry is determined. If this difference is greater than the value of the autotunnelling metric T, the entry with the higher metric is discarded. If difference is less then the autotunnelling metric T, then both entries are placed into/retained within the TENT database.

vi) As each neighbouring node N of each multi-protocol router P is added to the TENT database, the protocols that N can support are determined. For example, it the routing algorithm is run for Protocol A first, where router P has the capability of encapsulating protocol A within protocol B, if N supports only protocol B, and the TPID of P is set to "A" initially, then N's metric is incremented by T, and the TPID of N is set to B. If N supports only protocol A and the TPID of P is set to B, then de-encapsulation router (or tunnel termination point) of packets of protocol A destined for N (equivalently, the next hop heterogeneous router for N) is set to the System ID (SID) of P, and the TPID of N is set back to A. If N supports multiple protocols, N is added in the usual manner to TENT and is assigned the TPID value from P.

vii) If none of these situations arises, the normal SPF rules are implemented with the only exception that if a neighbouring node (or router) N of P is added to TENTS, it is assigned the same TPID value and also the same optimum heterogeneous router as P.

A Detailed Example of Route Determination

A description of the key aspects of the modified SPF algorithm according to the invention is now described. The description is illustrated by way of example with reference to FIGS. 3 to 22 which show how the TENT and PATHS databases of node 1 of FIG. 1A (which is therefore the parent system SELF) are populated in the context of network 100. For the purposes of this example, the assumed relative costs (distance or metric) of each network section are annotated on FIG. 1A between adjacent nodes.

In the embodiment described below with reference to FIGS. 3 to 22, SPF calculations are performed for Dual Router 1, following RFC 1195 and the proposed extension to the SPF algorithm in accordance with U.S. patent application Ser. Nos. 10/039,432 and 10/032,417.

Firstly, the two databases, PATHS and TENT as described herein above are used, where PATHS stores information relevant regarding a directed graph of shortest paths, and TENT stores information on tentative equivalent placements of a system in PATHS.

Thus each PATHS/TENT database includes data stored as a set of triplets of the form <N,d(N),{Adj(N)–DP(N), [TPID]}>, where N refers to the System ID, d(N) refers to N's distance from parent system, and {Adj(N)–DP(N), [TPID]} refers to a set of valid adjacencies the parent system may use to forward to N, with each adjacency's corresponding Dual Protocol Router Entry, representing ID of first Dual Router on the path from a source S to node N. If DP(N) is set to 0, no dual router exists on the path to the destination.

TPID is the transport Protocol ID, identifying the protocol which was used to transport a packet from S to N. The term 'this protocol' refers to the protocol for which the algorithm is being run.

In the embodiment shown in FIGS. 3 to 21, the metric cost for each route is indicated by the route. However, each time autotunnelling takes place an additional metric cost T is incurred, for example, in this embodiment T=2.

Upon initialisation, TENT 30 and PATHS 28 are empty. The algorithm must be run for each protocol supported by a router. As node 1 is a dual router, the algorithm must be either be run for each protocol in turn (one at a time) or the algorithm may be modified to run for each supported protocol at same time. In this case, the routing algorithm is being first run which respect to protocol A.

A special case entry is added to PATHS 28 in respect of the node 1, or router, that is running the SPF algorithm. This node is commonly referred to as SELF and the special entry may conveniently take the form <SELF, 0, W-0,[A]>, where W indicates that traffic to SELF is passed up to internal processes (see FIG. 3).

A respective entry in TENT 30 is created for each adjacency of SELF (see FIG. 4), which is achieved by the SPF algorithm referring to the adjacency database and determining which routers are adjacencies to SELF. The SPF algorithm calculates the cost of sending a data packet to each adjacency. During this process, the value for DP(N) is set to null for each adjacent router, irrespective of whether or not it is in fact a dual router.

Figure 4:
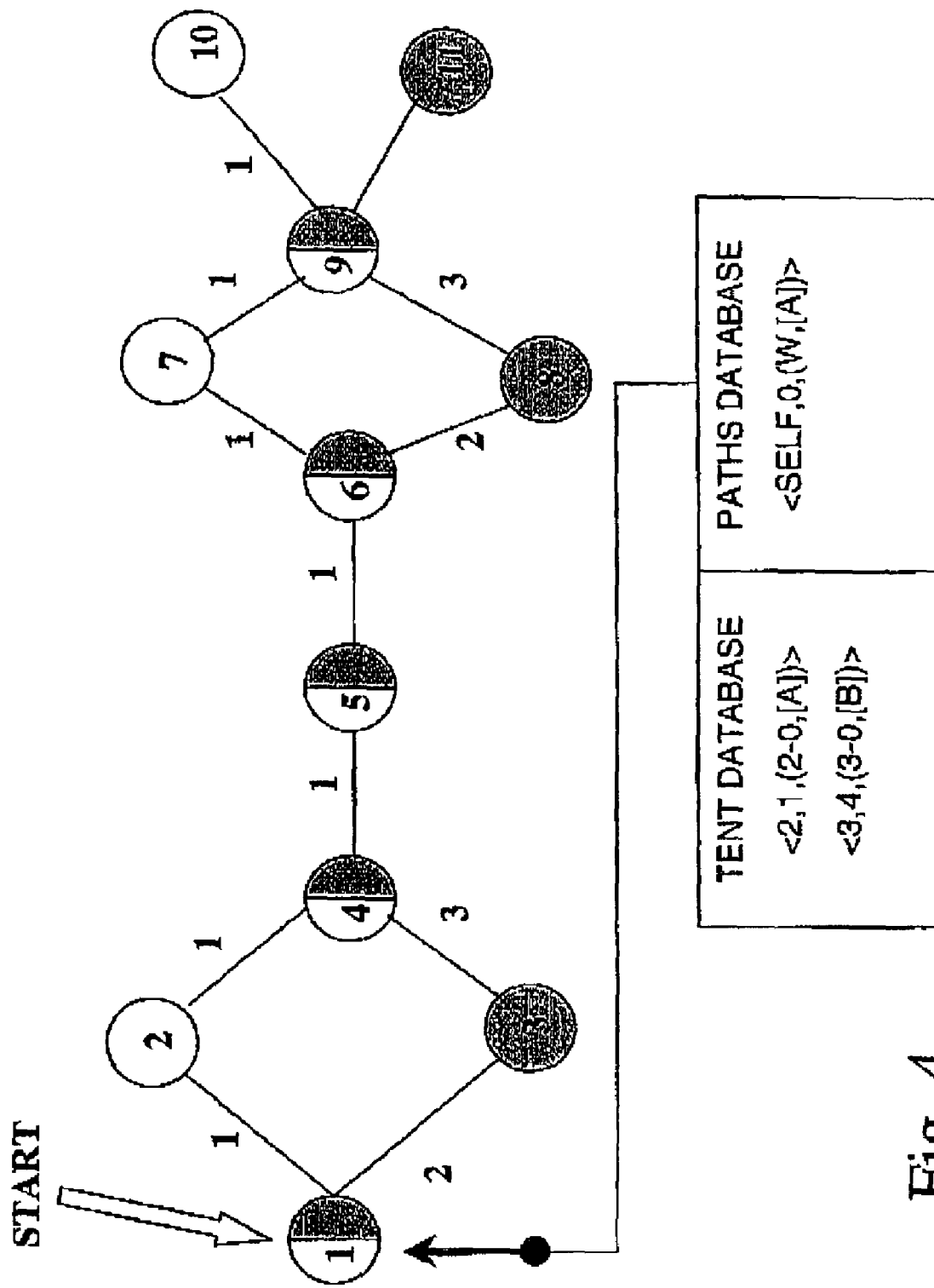
Figure 5:
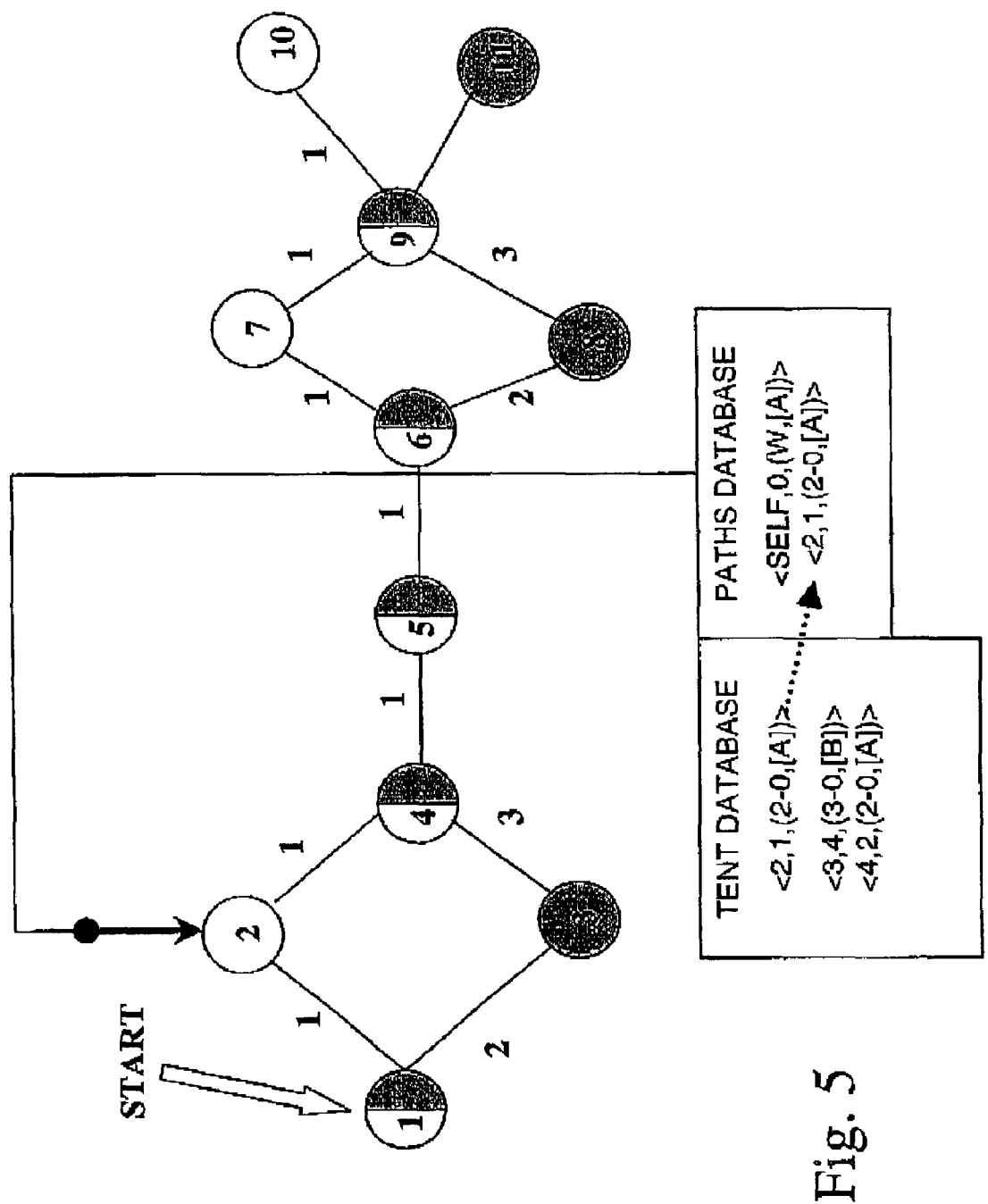
Figure 6:
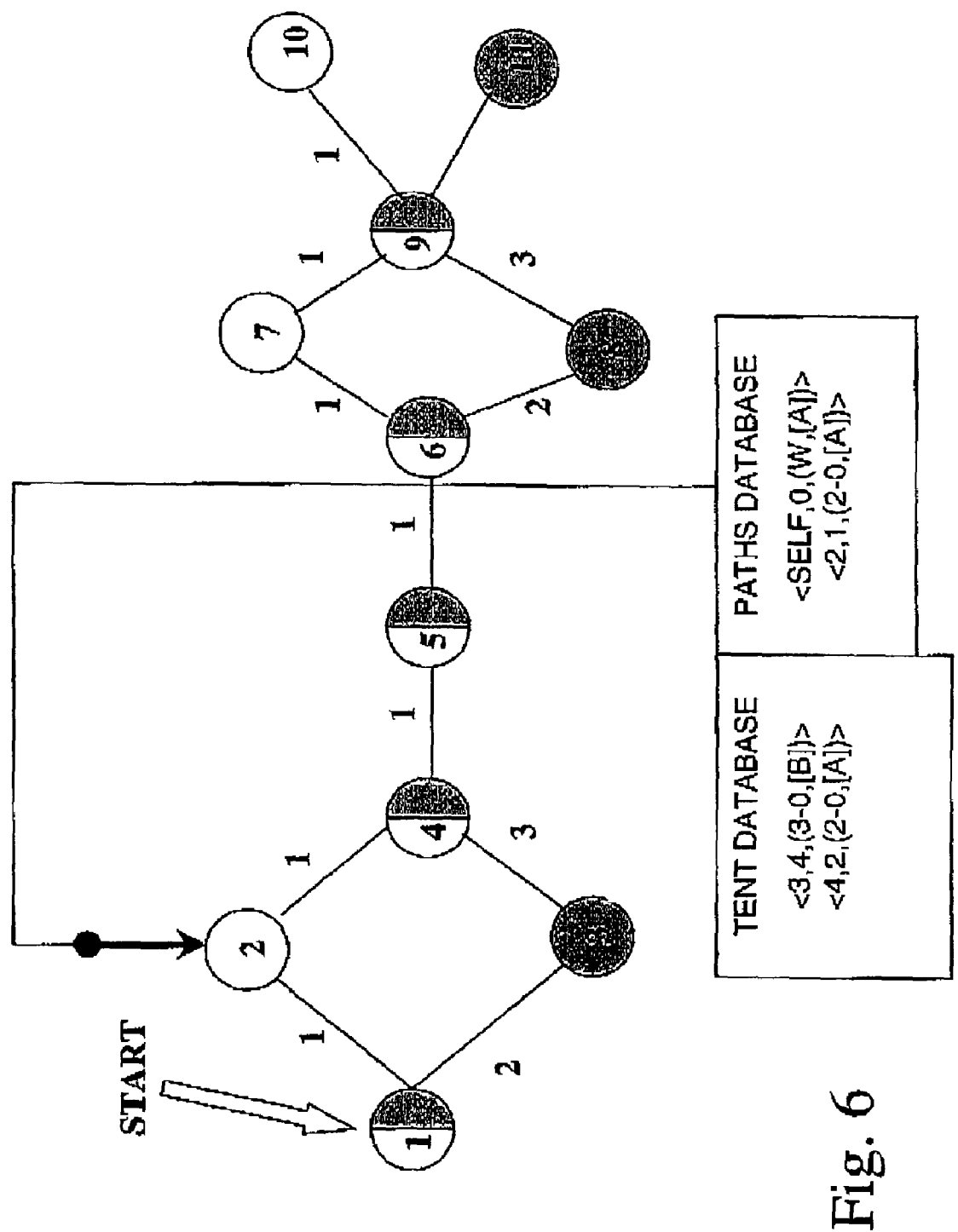
Figure 7:
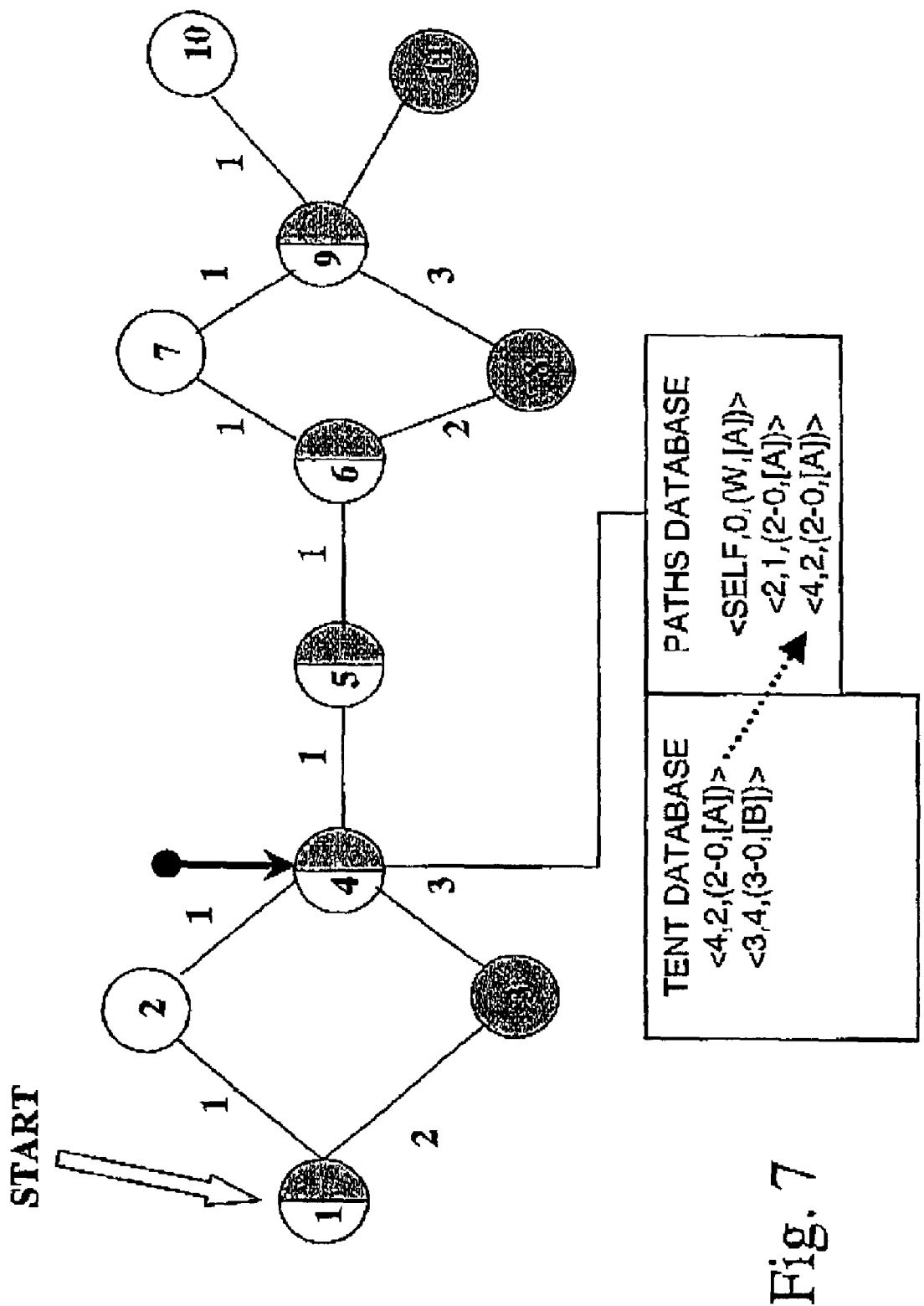
Figure 8:
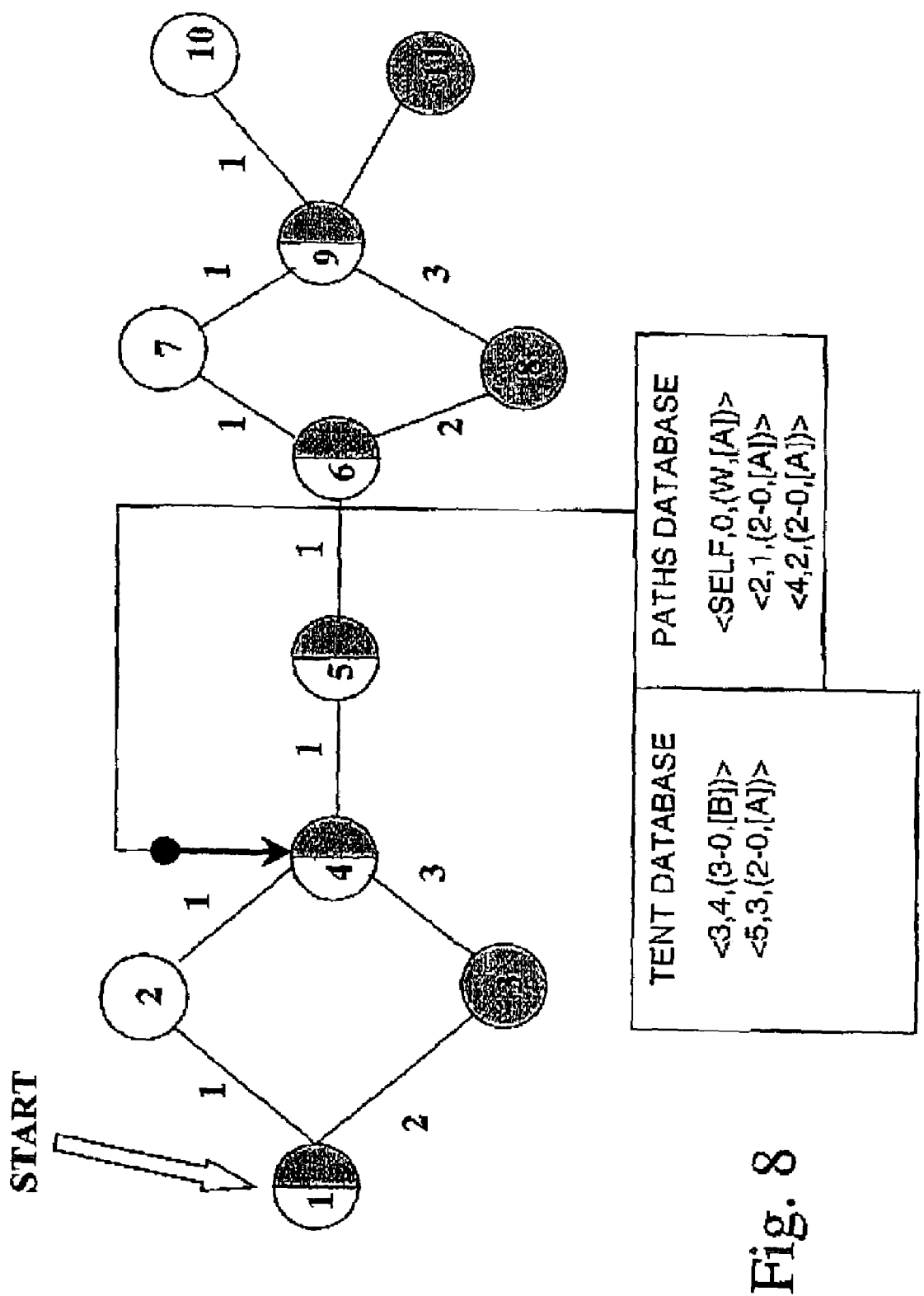
Figure 9:
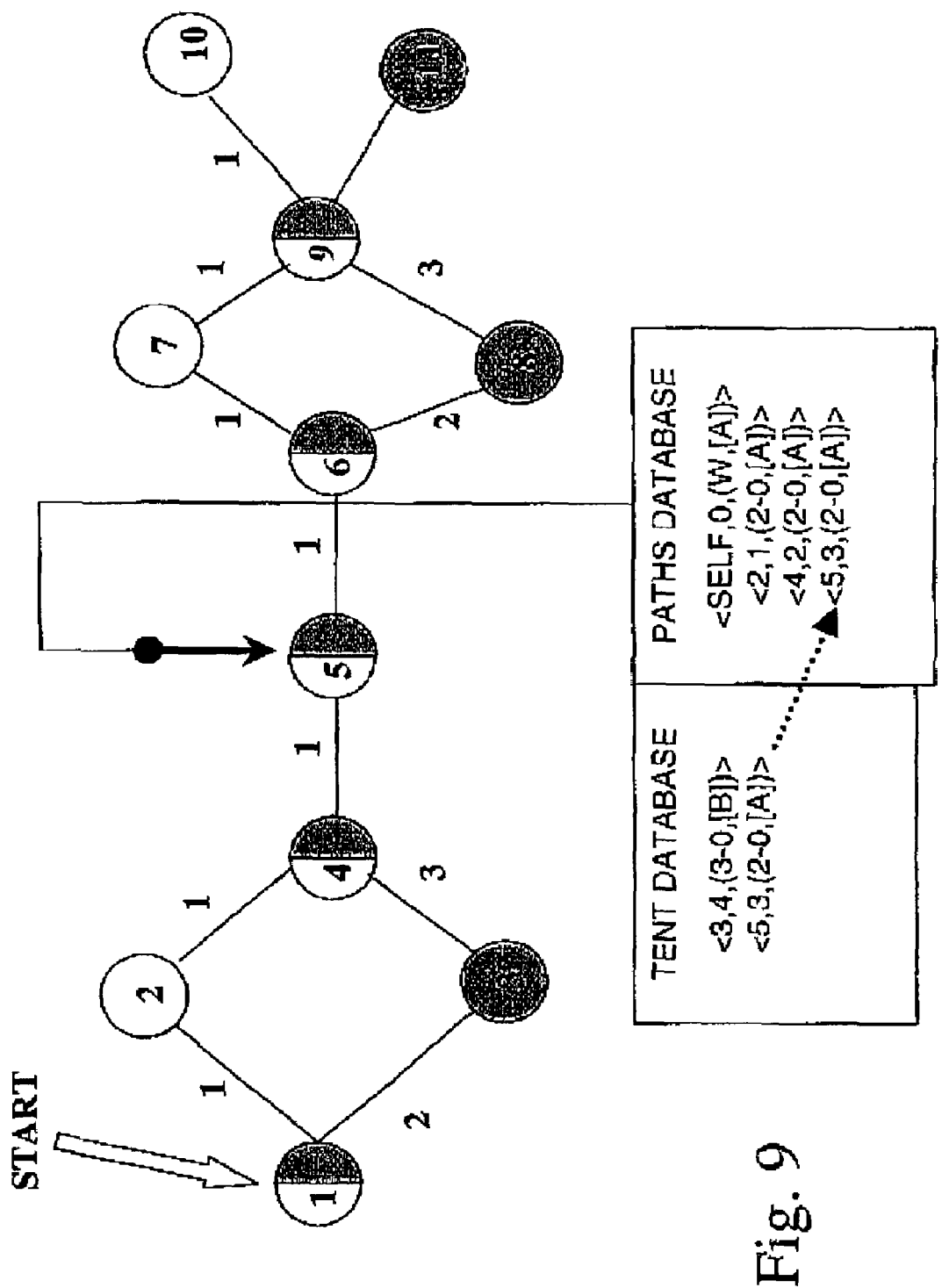
Figure 10:
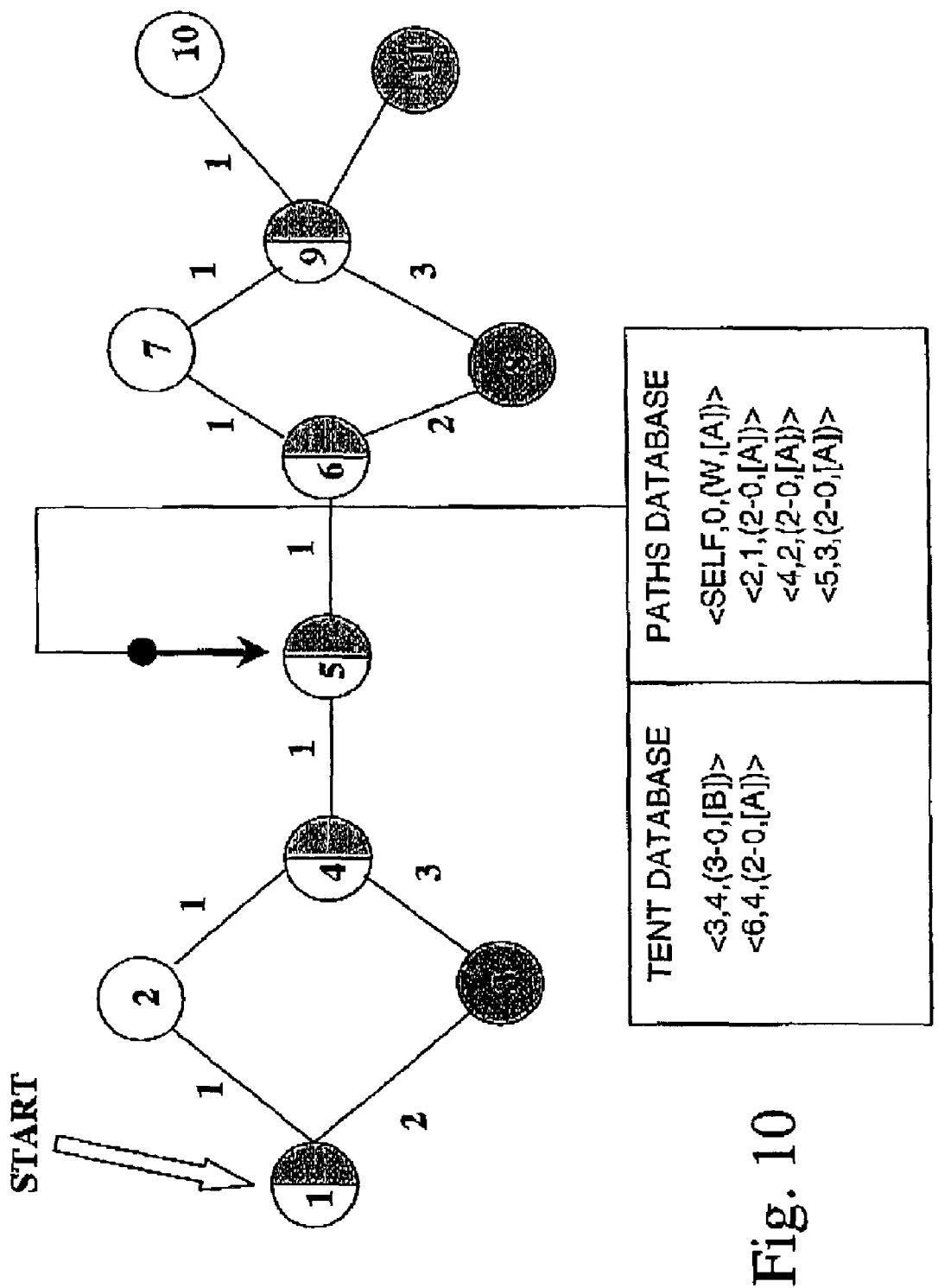
Figure 11:
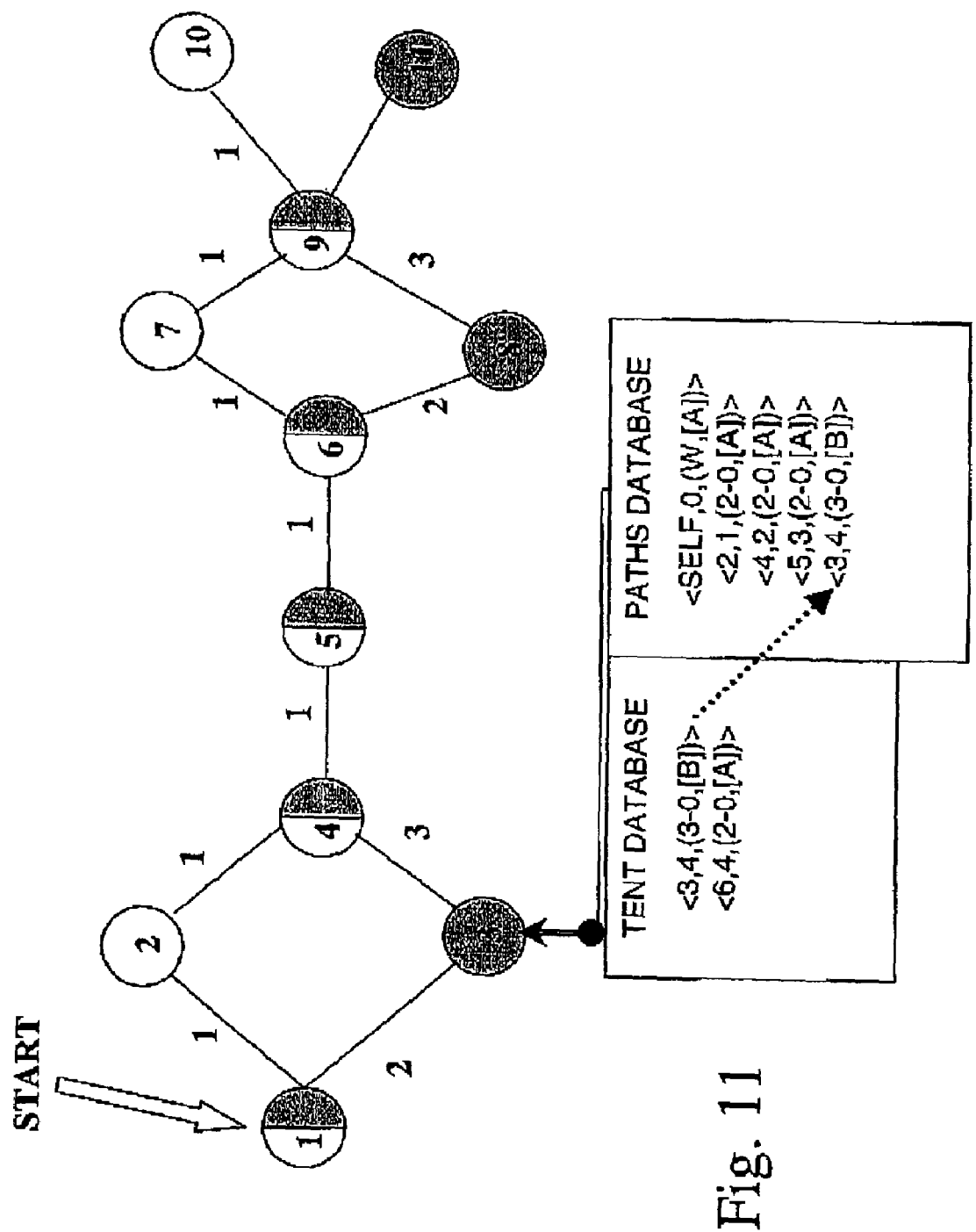
Figure 12:
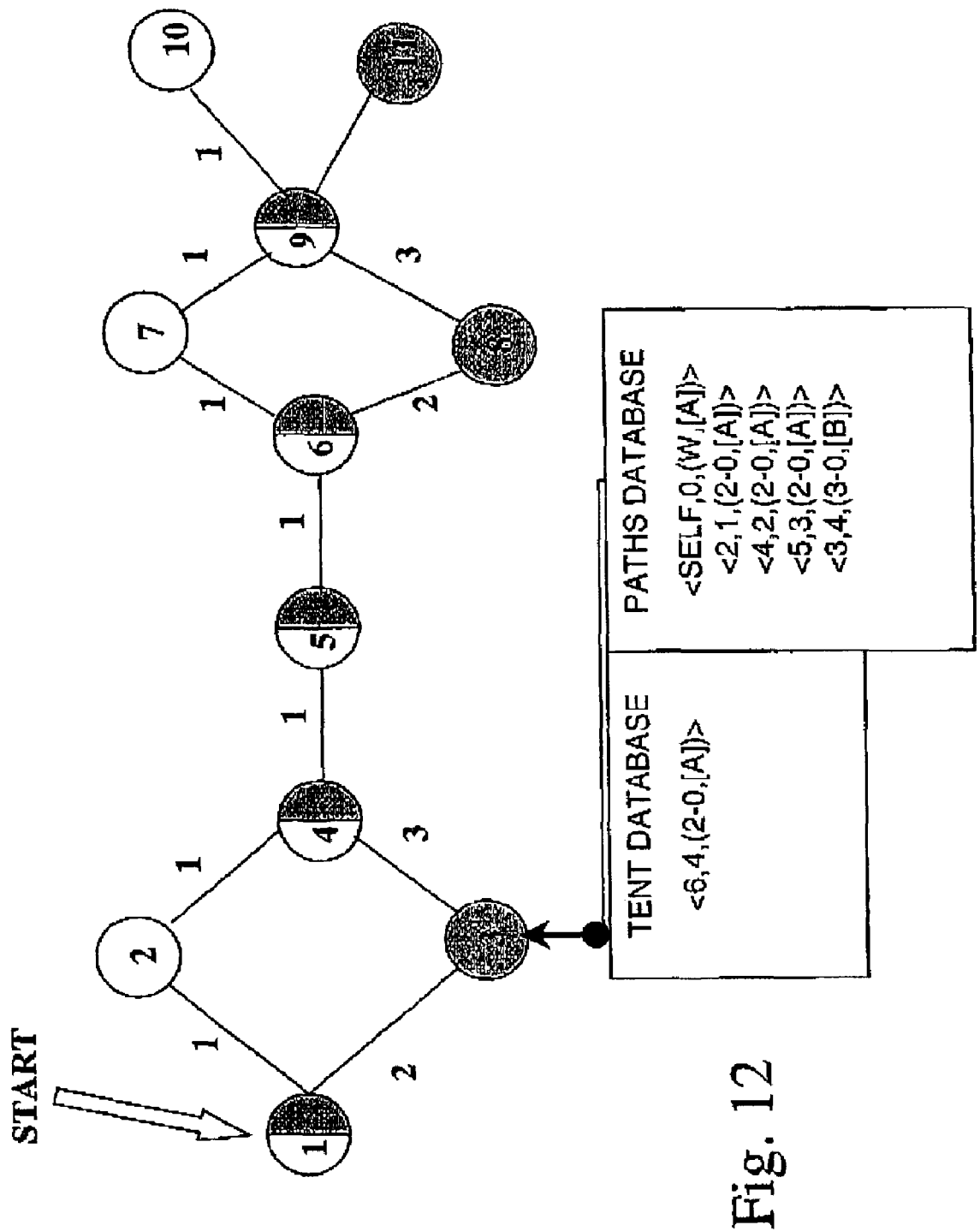
Figure 13:
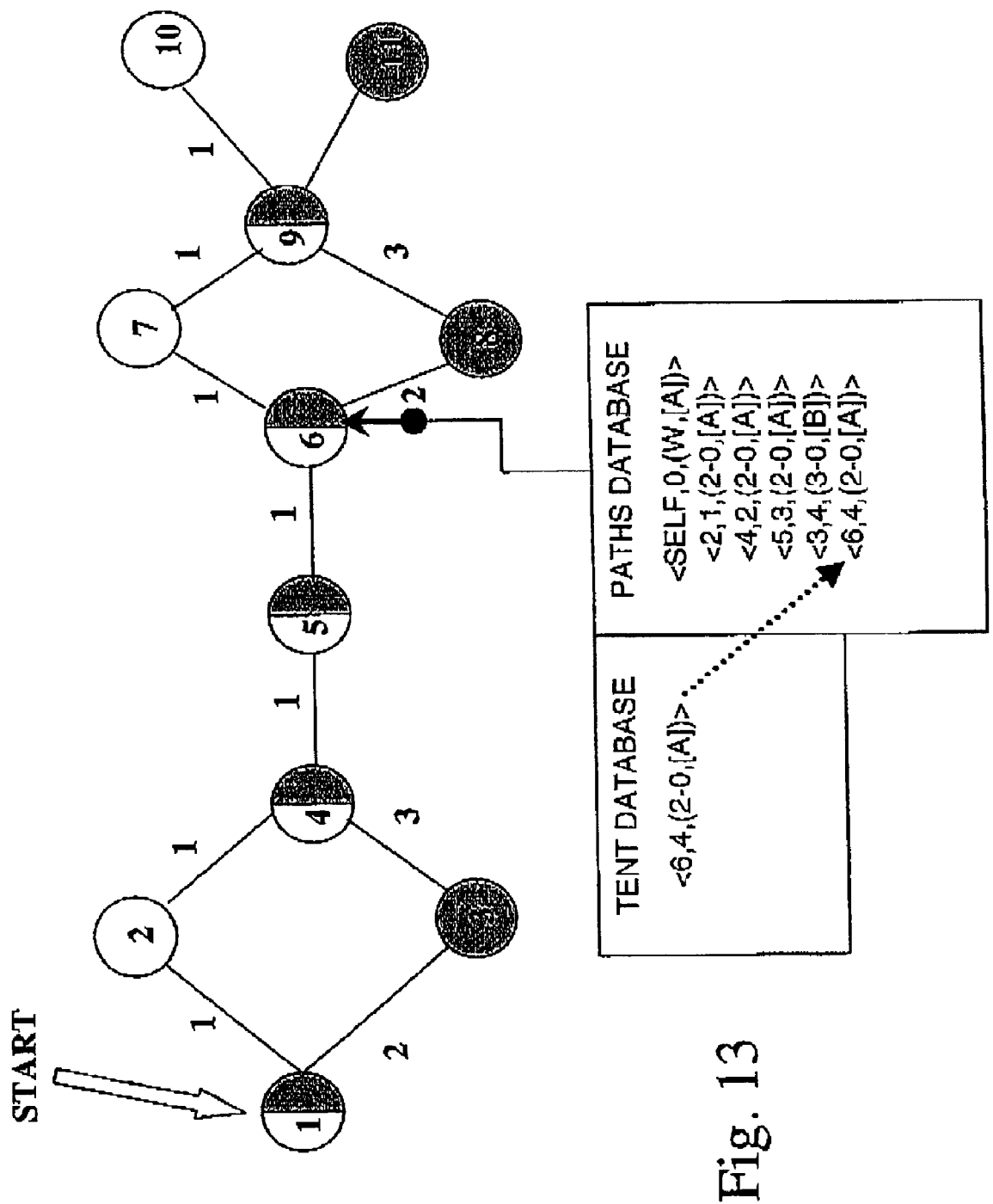
Figure 14:
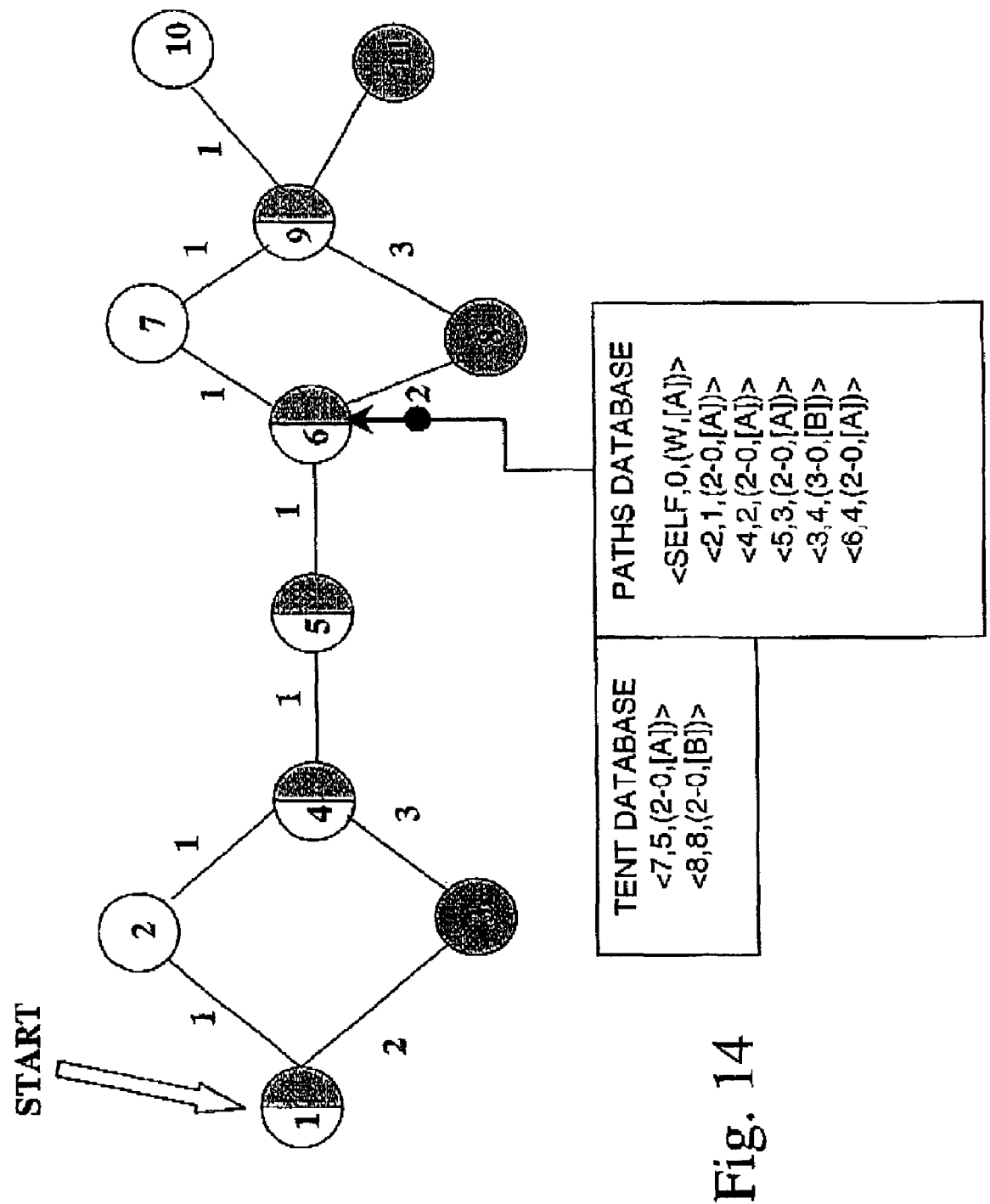
Figure 15:
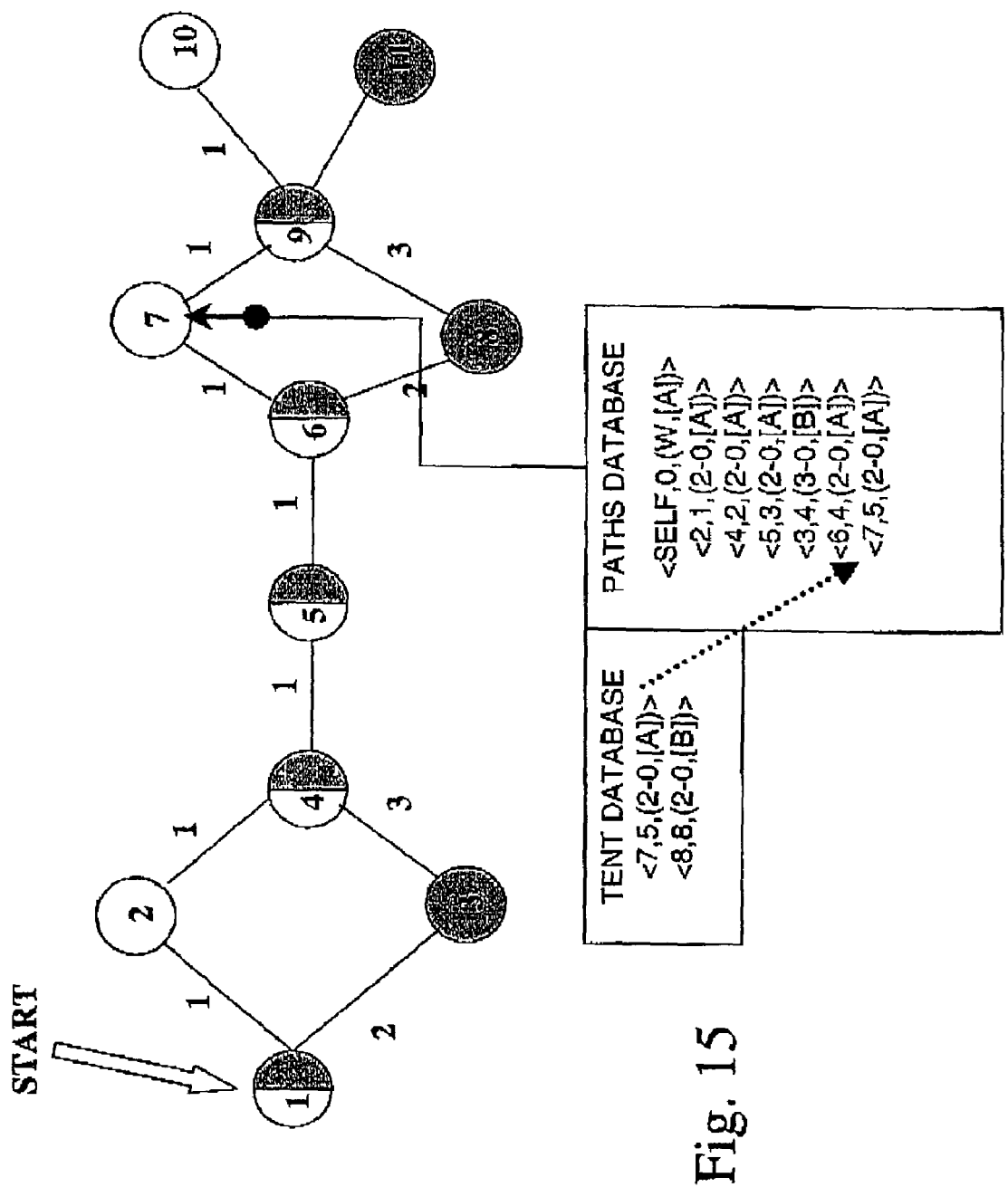
Figure 16:
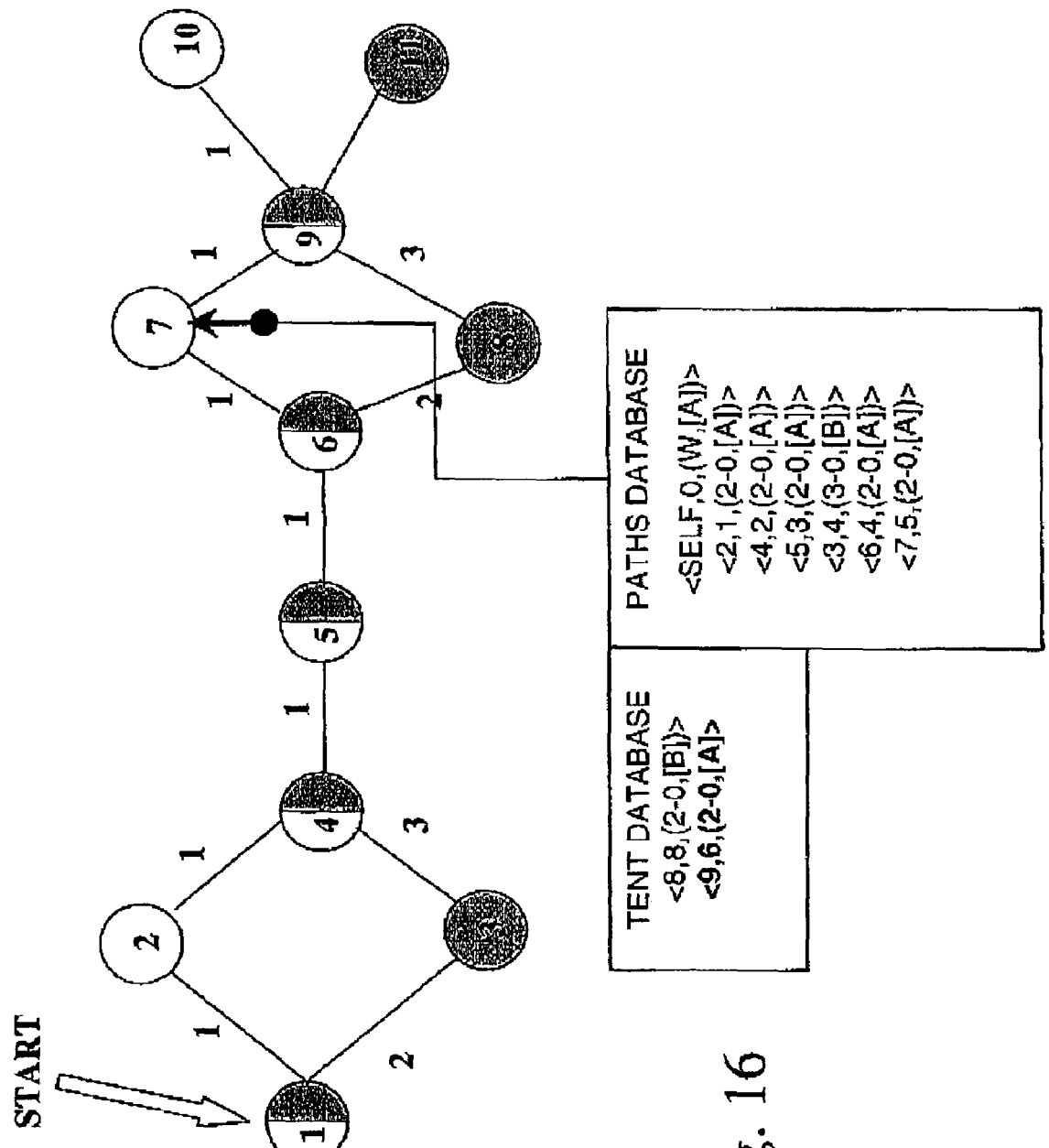
Figure 17:
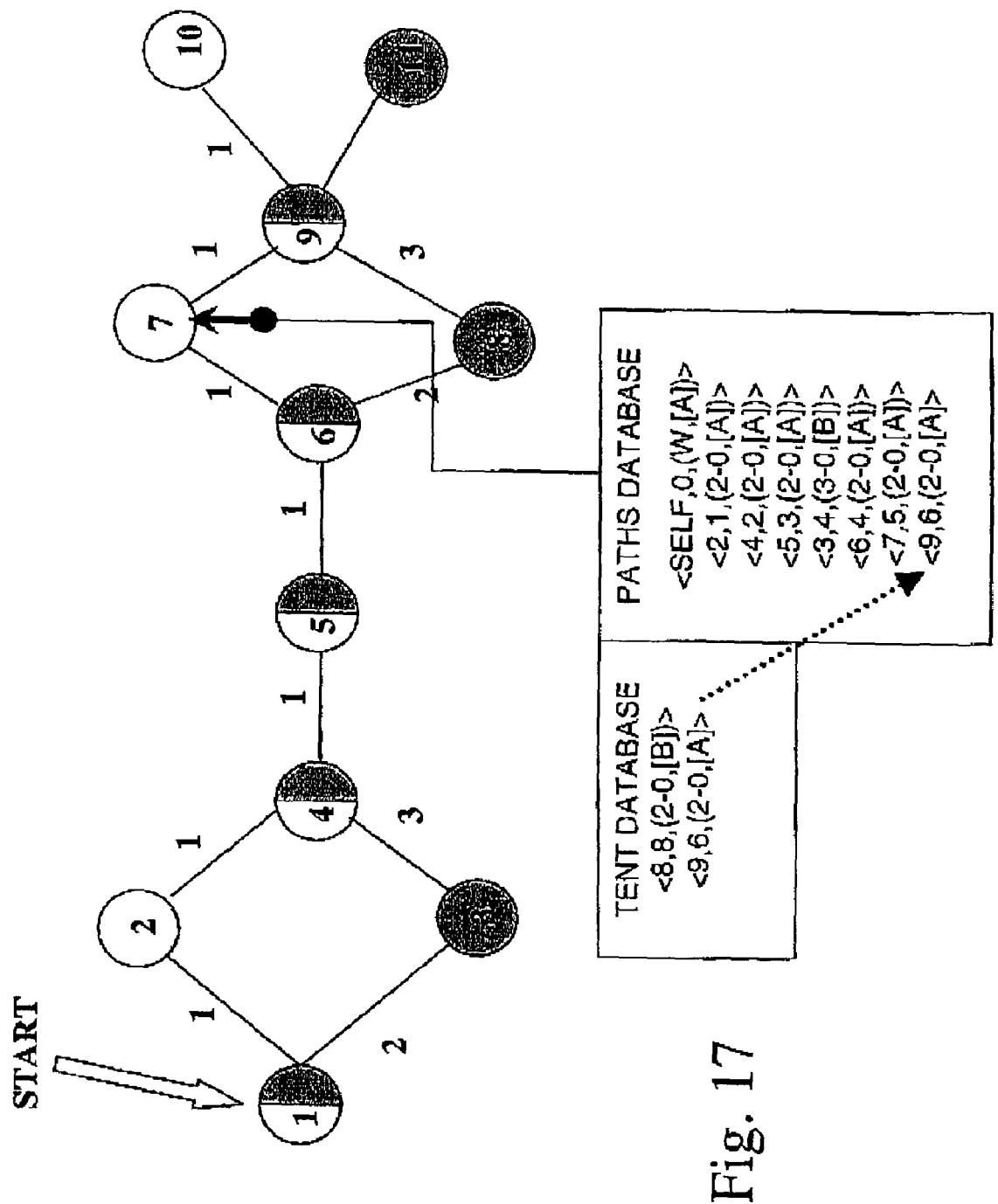

FIG. 4 shows the data records created in the TENT algorithm when running the modified algorithm. In the embodiment shown in FIG. 4, TENT is pre-loaded with the local adjacency database. Each protocol supported by this router should be considered and in the embodiment shown in FIG. 4, a TENT entry is created for protocol A which is being run first.

The first data record in TENT is created for node 2. This is the entry <2, 1,(2-0,[a])>. The second entry is created for 3, which requires autotunnelling protocol A into protocol B at node 1. This second entry is <3, 4,(3-0,[B])>. The second entry reflects the cost of auto-tunnelling as the autotunneling metric T=2 has been added to the link metric. The auto-tunnelling metric T is added to the route metric each time a packet is to be tunnelled. Thus the total metric cost in the TENT entry for reaching node 3 from node 1 is 2 (route)+2 (autotunnelling)=4.

Referring now to FIG. 4, the next stage in the shown embodiment is for a TENT entry in respect of the adjacency to SELF with the lowest metric to be moved to PATHS. More generally, if more than one entry in TENT shares the same d(N), then any suitable rule may be applied to select one of them, as is further discussed below.

When an entry is moved from TENT to PATHS, unlike conventional SPF, the modified SPF algorithm in accordance with U.S. patent application Ser. Nos. 10/039,432 and 10/032,417 is arranged to check whether or not the node N to which the new entry in PATHS relates is a dual router. To achieve this, the modified routing algorithm 26 refers to the LSP database 24 and examines the LSP issued by the node N to determine the encapsulation capability of the node. Conveniently, this is achieved by examining the "encapsulation capability" field of an Integrated IS-IS LSP such as are described in U.S. application Ser. Nos. 10/038,432 and U.S. 10/032,417.

If the node N is not an optimum heterogeneous router, then the DP(N) value is left at the null indicator (zero in this example). If the node N is an optimum heterogeneous router, then the value of DP(N) is set to the system ID of the node N. The "encapsulation capability" field needs to be examined first to determine however, if N supports the protocols "A" or "B", as this will enable the optimum heterogeneous router to be determined.

Thus, the value of DP(N) now provides identification of the optimum heterogenous router in the shortest path to node N (which at this stage would be the node N itself). Because, in the preferred embodiment, the modified routing algorithm 26 need only identify the optimum heterogeneous router in the path, the routing algorithm 26 need only check whether or not node N is a dual router if the value of DP(N) is the null indicator. Thus, it an entry in TENT is selected for placement in PATHS and its value of DP(N) is not null, then this value is kept as the value for DP(N) in the new PATHS entry. It is noted that in some conventional notation, the character N is replaced with the character P to distinguish an entry in PATHS as opposed to TENT. This notation is adopted hereinafter for reasons of clarity. Hence the new entry in PATHS may be written:

<P,d(P),{Adj(P)–DP(P),[TPID]}>

If the node P in respect of which an entry has just been moved from TENT to PATHS is an Intermediate System, then the routing algorithm 26 refers to the LSP database 24 and examines the LSP of the node P, in conventional manner, to identify its adjacencies with a view to creating one or more new entries in TENT in respect of the, or each, adjacency of node P. Also from the relevant LSP information, the routing algorithm 26 calculates the cumulative cost/metric in sending a data packet from the parent node SELF (node 1 in the present example) to each of the identified adjacencies of node P via node P. Also added to this cost will be the autotunnelling cost.

A number of conditions must be satisfied before a new entry in TENT is created. The relevant of these conditions are now outlined. In respect of the, or each, adjacent node to node P, the routing algorithm 26 checks if PATHS already contains an entry in respect of the respective adjacent node. If so, then no new entry is created in TENT in respect of that adjacent node. The routing algorithm 26 also checks if TENT already contains an entry in respect of the, or each, respective adjacent node. If not, then a new entry is created in TENT in respect of that adjacent node.

If TENT does already contain an entry in respect of a given adjacency to node P for a given [TPID], then the routing algorithm 26 performs a cost or metric comparison between the existing entry in TENT in respect of the given adjacency and the cost metric that it has just calculated for the given adjacency. If the former cost is less than the latter cost, then the routing algorithm 26 does not create a new entry in TENT in respect of the given adjacency. If the former cost is greater than the latter cost, then the routing algorithm deletes the existing entry in TENT in respect of the given adjacency and creates a new entry in TENT using the cost information that has just been calculated. If the former cost is equal to the latter cost, then the routing algorithm 26 creates a new entry in TENT (or amends the existing entry) that incorporates both the information contained in the existing entry and the newly calculated information in respect of the give adjacency. In this case, the N and d(N) components of the entry in TENT will remain unchanged but an additional Adj(N)–DP(N) pair for the given [TPID] will be added to the set {Adj(N)–DP(N)}. The newly added Adj(N)–DP(N) pair may have the same value for Adj(N) as the existing entry in TENT for the given adjacency but a different value for DP(N), or vice versa.

In summary the routing rule is essentially that when adding an adjacency to TENT, if one already exists for that SID and the TPIDs are identical, the adjacency with the higher metric is discarded.

If, however, the TPIDs differ, the difference between the metric of the entry with the TPID of the protocol the algorithm is being run for (the 'this protocol' TPID) and the other protocol metric (i.e. the metric of the entry for "the other protocol") minus the metric of the of the entry for "this protocol" is determined. If this difference is greater than the autotunnelling metric T, then the adjacency with the "this protocol" TPID is discarded. If the difference is less than 0, then the adjacency with "the other protocol" TPID is discarded. Otherwise if the difference is zero both entries are retained.

This rule is shown below (where x is the metric for the protocol TPID entry)

If (x("other protocol")−x("this protocol" TPID)<0
   discard B

Else if (x("other protocol")−x("this protocol" TPID)>T
   discard A

Else
   add both to TENT

When an entry is moved from TENT to PATHS, it is deleted from TENT. In the worked example shown in FIG. 4, the entry <2, 1,(2-0),[A]> is the entry in TENT which has the lowest metric and so this is moved to PATHS and deleted from TENT.

Each new entry in TENT takes the form illustrated above, wherein the value of N is now equal to the System ID of the respective adjacent node in respect of which the new TENT entry is being made, d(N) is the cumulative cost from the parent node SELF to the respective adjacent node and the respective values of Adj(N) and DP(N) are the same as the corresponding values in the entry in PATHS from which the new TENT entry was derived i.e. Adj(P) and DP(P) respectively. As a result, since the value of DP(P) identifies, where applicable, the existence of a dual router in a path to node P (in some cases P itself will be the dual router) then, once a dual router is identified by the modified routing algorithm 26 in the manner described above, all subsequent entries in TENT (and further subsequent new entries in PATHS) which relate to network paths that include the identified dual router will be marked as such. Transferring, or carrying, the system IDs of dual routers from PATH entries to new TENT entries in this way is an efficient way to identify dual routers in network paths and is found to significantly reduce the computational burden on the routing algorithm that would otherwise be incurred.

The next step for the algorithm 26 is to refer to TENT again in order to identify the next entry to be moved to PATHS.

It will be appreciated from the foregoing that the modified algorithm 26 according to the preferred embodiment of the invention provides an efficient means of identifying the optimum heterogeneous routers in the shortest paths to destination nodes and enables the cost of encapsulation to be reflected in the shortest path.

The routing algorithm 26 need only test whether or not a given router, or node, is a dual router once, following which this information is carried between the TENT and PATHS databases in all subsequent entries relating to a path that includes the identified dual router. Thus, when the routing algorithm 26 completes the PATHS database, information identifying the nearest dual router in each shortest path is already included in each relevant entry along with an indication of the cost of auto-tunnelling. This is achieved with a significantly reduced computational burden in comparison with, for example, re-visiting each shortest path after completion and examining the nodes in each path to identify dual routers.

It is not essential that respective values for Adj(N), Adj(P) and DP(N), DP(P) for a given TPID are stored in respective pairs. The respective values for these parameters may equally be stored in separate fields. It is convenient to store them in pairs as described above especially when the set of {Adj(N)–DP(N),[TPID]} or {Adj(P)–DP(P),[TPID]} comprise more than one member.

It will be understood that, as is conventional, each router in the network 100 performs a routing algorithm, in this case SPF routing algorithm, in order to create and maintain its own PATHS database. However, only the dual routers are required to implement the modified routing algorithm of the invention.

Further, in the preferred embodiment wherein all of the bi-lingual routers implement Integrated IS-IS, it is not essential that all of the single language routers also run Integrated IS-IS. For example, the OSI-only routers may run IS-IS only. This normally means that their LSPs will not include a "protocols supported" field, but the routing algorithm may be modified to recognise that the absence of a "protocols supported" field in an LSP signifies that the router that issued the LSP is OSI-only.

End Systems do not affect the operation of the present invention and may be treated in normal manner by the routing algorithm.

FIGS. 5, 7, 9, 11, 13, 15, and 17 show that in the case where a plurality of TENT entries exist of the form <*,x,*>, the entry with minimal x is selected. Whenever there is more than one element in the TENT list for a given x, one of the elements (if any) for a system which is a pseudo-node is selected, and this entry is added to PATHS.

FIGS. 8, 10, 12, 14, and 16 show that if the system just added to PATHS is an IS, the next step is to examine its LSP and add these entries to TENT. When adding an entry to TENT, if TPID(P) is 'this protocol', and if the LSP identifies that the system does not support 'this protocol', then N's metric is incremented by T and the TPID is set to B. Similarly, if when adding an entry to TENT, TPID(P) differs from 'this protocol', and it the LSP identifies that the system supports 'this protocol' only, then the DP(P) value is set for this adjacency to be the system ID of P, and the TPID is set to A.

Figure 18:
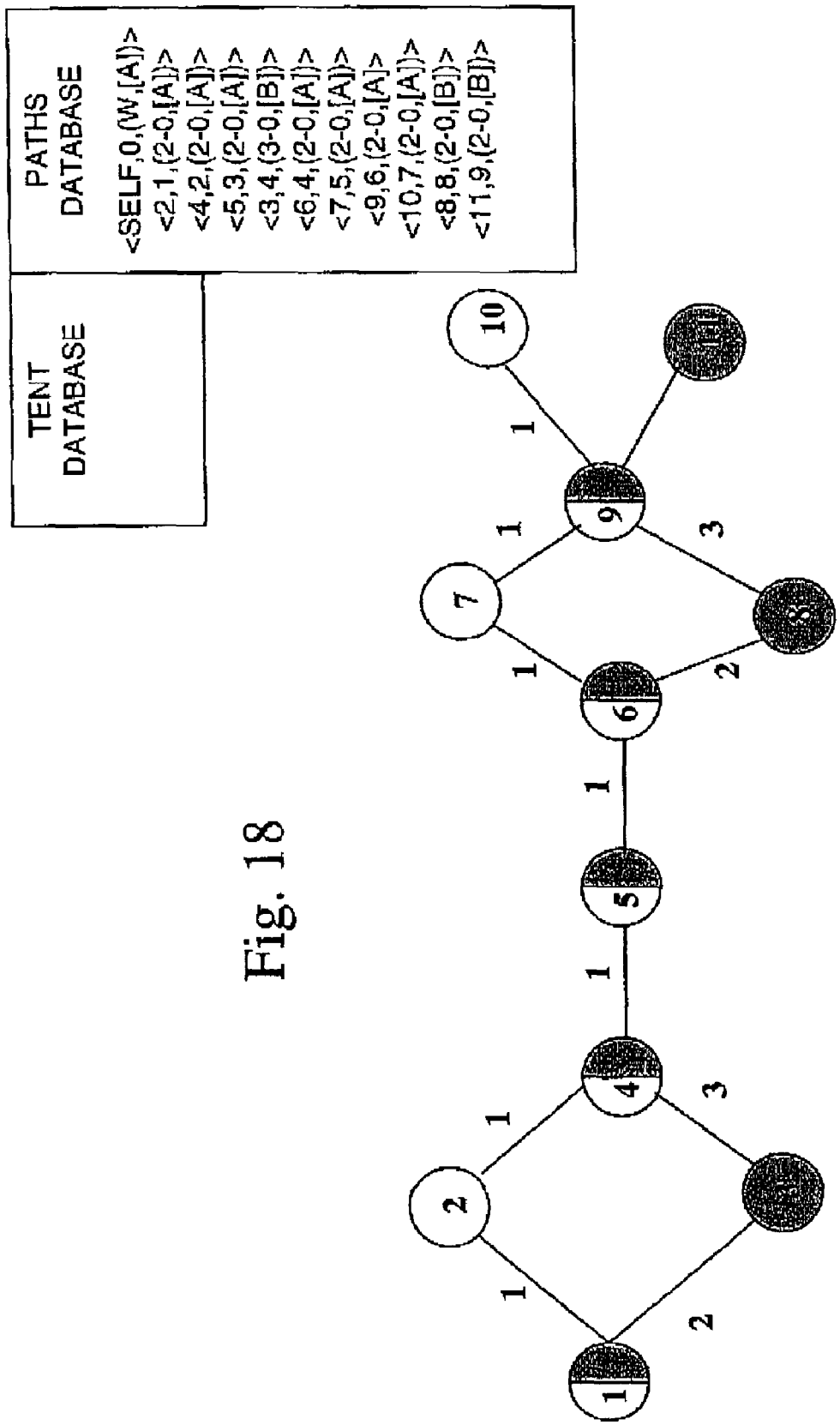

FIG. 18 shows that eventually, after the destination has been reached, the TENT database will be empty and the process can terminate. The next stage in the process is to run through the entries in PATHS and to put protocol A's routes into A's routing table and for B's routes to be discarded.

Figure 19:
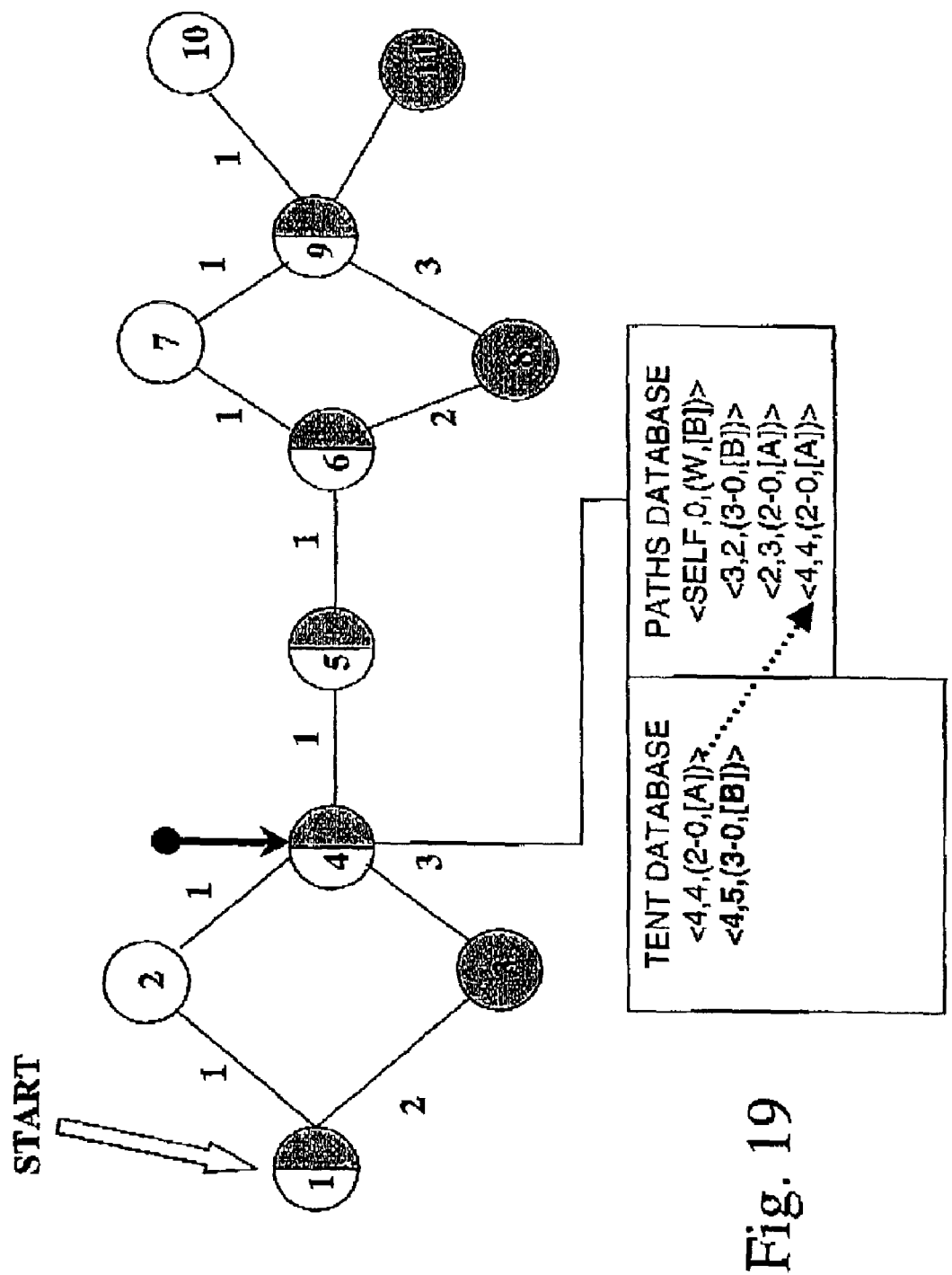
FIGS. 19 to 21 show successive representations of a first database, TENT, and a second database, PATHS, as they are populated during a worked example of a preferred embodiment of the invention for a second protocol ("B")

In FIG. 19, the process is being repeated for protocol B at node 4. As before if the system just added to the PATHS database is an IS, its LSP is examined and these entries are added to TENT. Now, however, when adding an entry to TENT, if TPID(P) is 'this protocol' (here "B"), and if the LSP identities that the system does not support 'this protocol', i.e., "B", N's metric is incremented by T and the TPID is set to protocol A. When adding an entry to TENT, if TPID(P) differs from 'this protocol', and if the LSP identifies that the system supports 'this protocol' only (i.e., protocol B only), then the DP(P) value for this adjacency is set to be the system ID of P, and TPID is set to B.

Also, where the "this protocol" is protocol B, if adding an adjacency where one already exists, and if the TPIDs are different the following applies:

If (x(TPID[A])−x(TPID[B])<0
   discard B

Else if (x(TPID[A])−x(TPID[B])>T
   discard A

Else
   add both to TENT

In this instance, <4,5,(3-0,[B])> is discarded before it is added to TENT.

Figure 20:
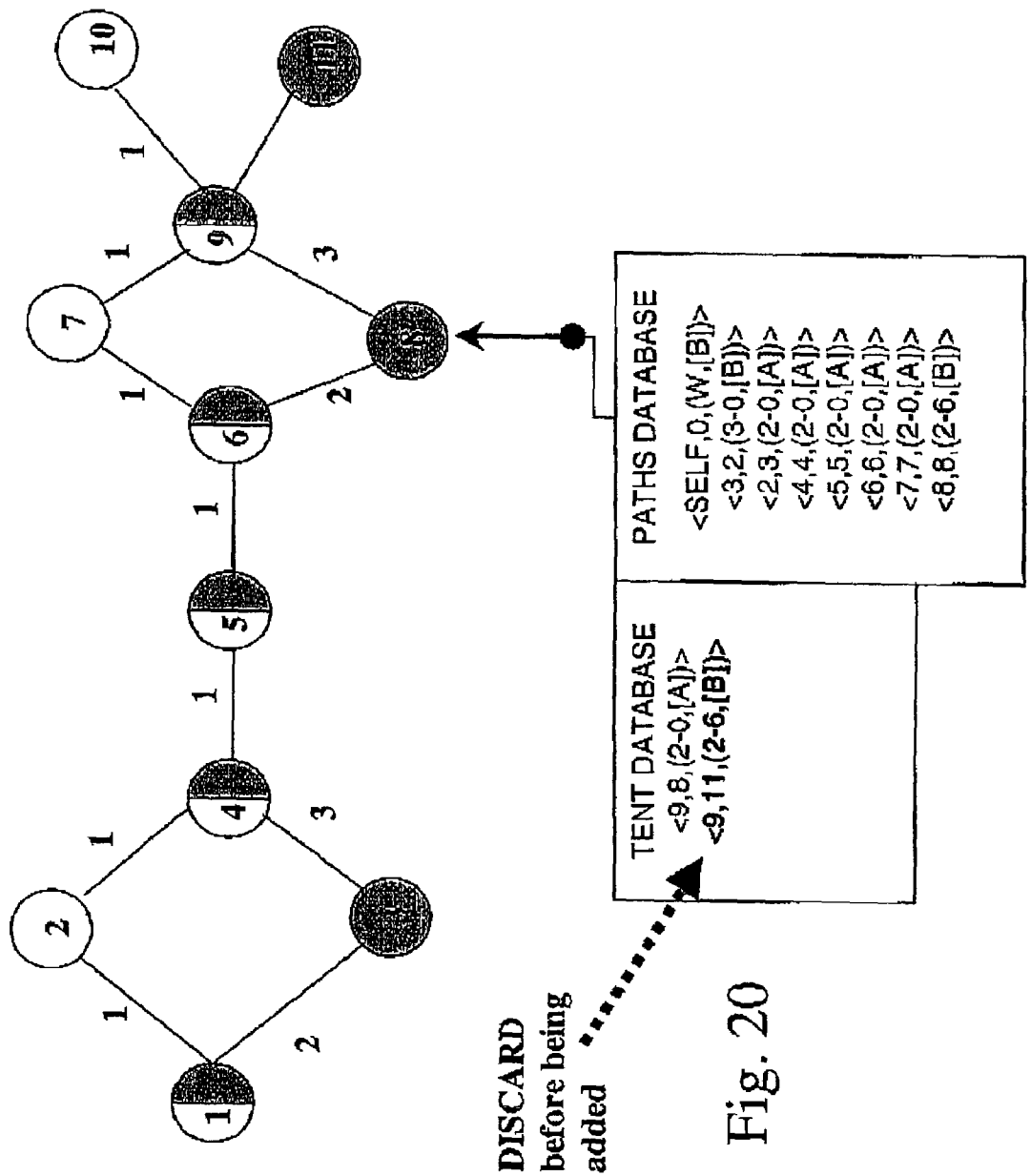

FIG. 20 illustrates that if an adjacency is added where one already exists and if the TPIDs are different, the above rule applied results in <9,11,(2-6,[B])> being discarded before it is added to TENT.

Figure 21:
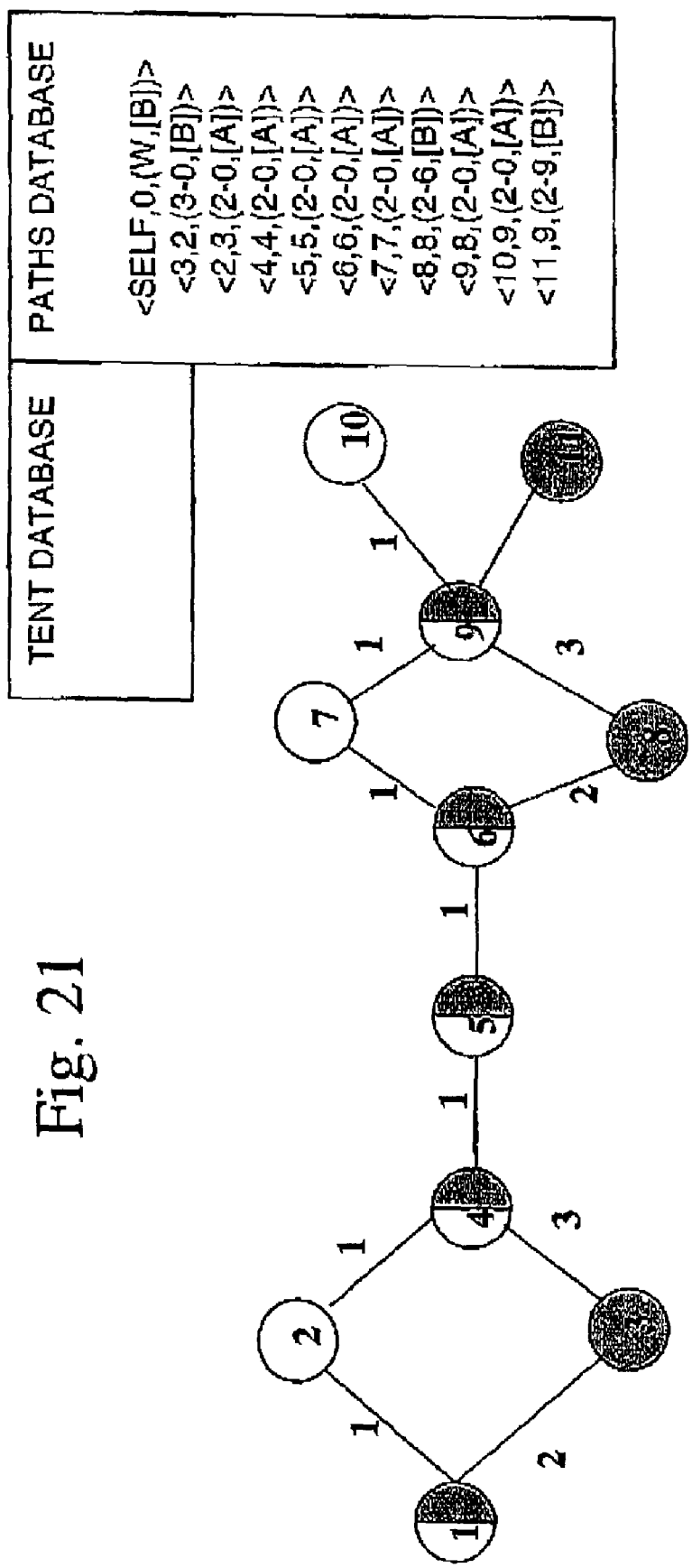

Finally, FIG. 21 illustrates the process terminates when TENT is empty. The next stage is to run through the data records in PATHS and put protocol B's routes into B's routing table. Protocol A's routes can be discarded.

Figure 22:
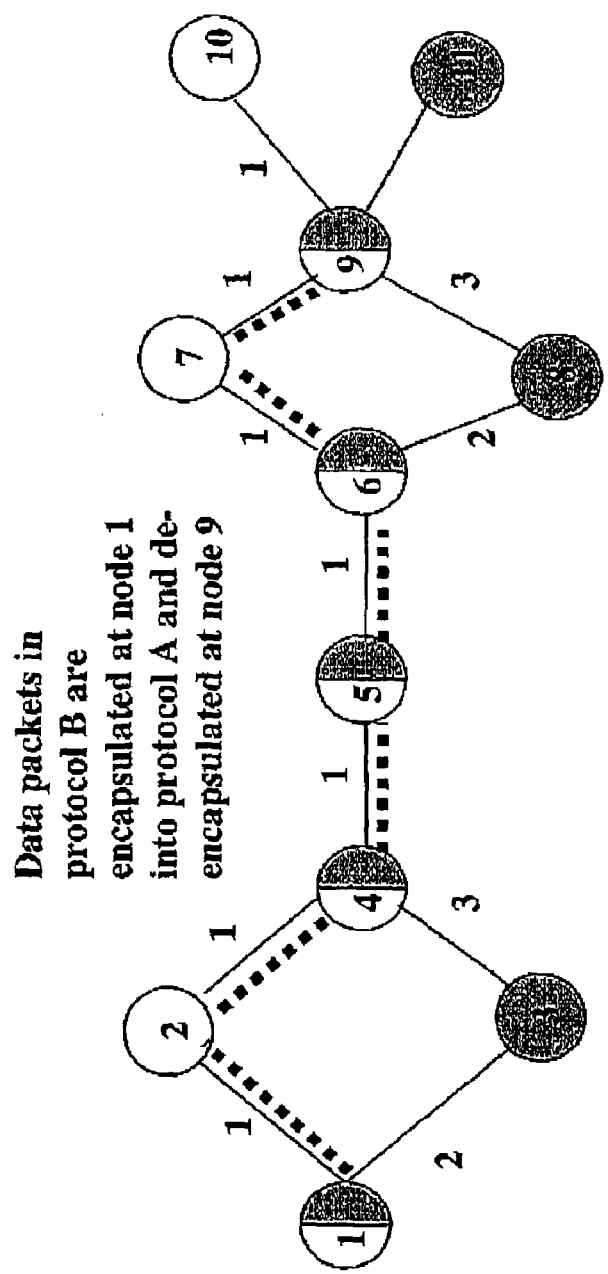
FIG. 22 shows the routing tables derived by a routing method according to an embodiment of the invention for an optimum path across the network shown in FIGS. 3 to 21.

FIG. 22 shows the two resulting routing tables, one for each of the two protocols A and B. Where an entry in PATHS corresponds to a TPID of the other protocol and the system supports "this protocol", the route is added with a Dual Protocol Router of itself. Thus, when routing protocol B to system 9, a PATHS entry of <9,8(2-0,[A])> exists, and using the above process results in the route indicated in FIG. 24 by the dashed line. This means the best route from system 1 to system 9 for protocol B, is to tunnel the protocol B packets over protocol A to system 9. There they are de-encapsulated from protocol A back to B and handled within the protocol B stack.

Whilst the above embodiment has a single fixed value of T, It is also possible to vary T in a predetermined manner depending on which protocol is to be tunnelled over which protocol, and/or vary the cost of autotunnelling dependent on some other route or node characteristics. In this way, it is possible to avoid congested nodes when autotunnelling for example, and so ensure more efficient use of network capacity.

For example, if the tunnelling metric is increased, so that T=3, then when running the routing algorithm for protocol 8, the resultant paths database and routing table differ from that when the tunnelling metric T=2. For example, FIG. 23A shows the PATHS database and routing table when T=2 for protocol B, However, if T=3 is used instead, then the PATHS database for protocol B indicates a different route, and the routing table reflects this (FIG. 23B).

The invention is described above with particular reference to the PATHS, TENT, Adjacency and LSP databases. A skilled person will appreciate that these databases do not necessarily need to be implemented separately and that the information carried therein may alternatively be stored in one or more database, or other suitable memory structure. Further, it is not essential that the, or each, database be included in the parent node. For example, in an alternative embodiment, the or each database may be held in a server (not shown), or other computer system, that interfaces with the parent node, or may be stored in an external storage device (not shown).

It will be understood that the present invention is not limited to use with Integrated IS-IS and may be used with systems running other Link State protocols. Other Link State Protocols, such as Open Shortest Path First (OSPF), also use Link State PDUs (known as Link Sate Advertisements (LSAs) in the case of OSPF) to enable communication amongst routers.

In some cases, the LSPs/LSAs do not include a "protocol supported" field. For example, legacy equipment may not support a "protocol supported" field and/or a "deencapsulation/encapsulation" field. The invention is therefore particularly suited for use with Link State protocols wherein the LSPs, or equivalent data packet, do include a "protocols supported" field and a "deencapsulation/encapsulation" field or wherein it is possible to modify the LSP, or equivalent data packet, to include one or more fields for carrying this information. By way of example, the invention may be used to tunnel IPv6 over IPv4 (or vice versa) using OSPF.

Details of the Modified Routing Algorithm

There follows a specific example of a modified routing algorithm according to the present invention, steps of which are shown in FIGS. 24A to 24F which illustrate a modified routing algorithm based on the SPF algorithm commonly known as Dijkstra's algorithm which is described in RFC 1195.

The following algorithm must be run for each protocol supported in the heterogeneous network. The triplet value as defined in RFC 1195 is extended to include:

i) A D(P) value which indicates the optimum tunnel termination point on a PATH to a node. This value will be an OSI system ID.

ii) A "Transport Protocol ID", TPID value. If this value is set to the protocol for which the algorithm is being run, the cost entry in either PATHs or TENTS will refer to the cost of an natively routed packet to reach a particular destination, if it is set to a different value it will represent a packet of this protocol being encapsulated within another protocol.

The SID and "Transport Protocol ID" field pair will always be unique.

In this example, it is assumed that the embodiment is being implemented with respect to a protocol 'A' in a network also containing nodes that support only protocol 'B'.

Figure 24A:
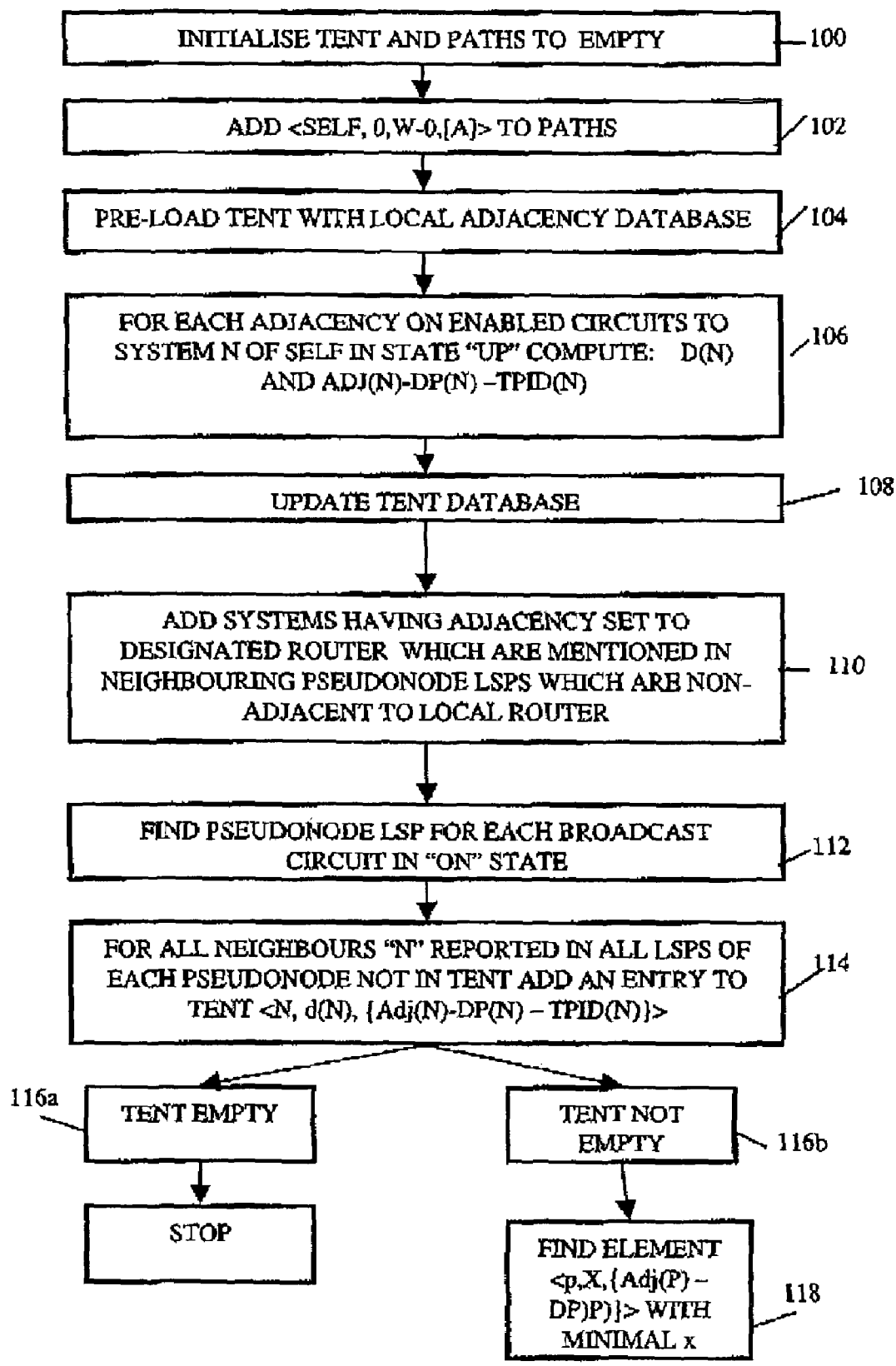
FIGS. 24A to 24G shows steps in a modified routing algorithm according to one embodiment of the invention.

Referring now to FIG. 24A, initial steps in a method of routing using a routing algorithm modified in accordance with the invention are shown.

Step 100: Initialise TENT and PATHS to empty. Initialise tentlength to [internalmetric=0, externalmetric=0], here tentlength is the pathlength of elements in TENT that we are examining.

Step 102: Add <SELF,0,W-0,[A]> to PATHS, where W is a special value indicating traffic to SELF is passed up to internal processes (rather than forwarded).

Step 104: Pre-load TENT with the local adjacency database. Here each entry made to TENT must be marked as being either an End System or a router to enable the check at the end of Step 2 to be made correctly. Each local IP reachability entry is included as an adjacency, and is marked as being an End System.

Step 106: For each adjacency Adj(N) (including level 1 OSI Manual Adjacencies, or level 2 OSI enabled reachable addresses, and IP reachability entries) on enabled circuits, to system N of SELF in state "Up" compute:

d(N)=cost of the parent circuit of the adjacency (N) obtained from metric k, where k=one of {default metric, delay metric, monetary metric, error metric}.

If N does not support "protocol A" then this cost should be incremented by the value "T" as previously configured by a network administrator.

Adj(N)-DP(N)-TPID(N)=the adjacency number of the adjacency to N, the SID of the optimum dual router along the path to the neighbour which in this case i.e. during initialisation will be set to 0 and the TPID value which will be set to 'A' if N supports protocol A or 'B' if N does notsupport protocol 'A'.

Figure 24B:
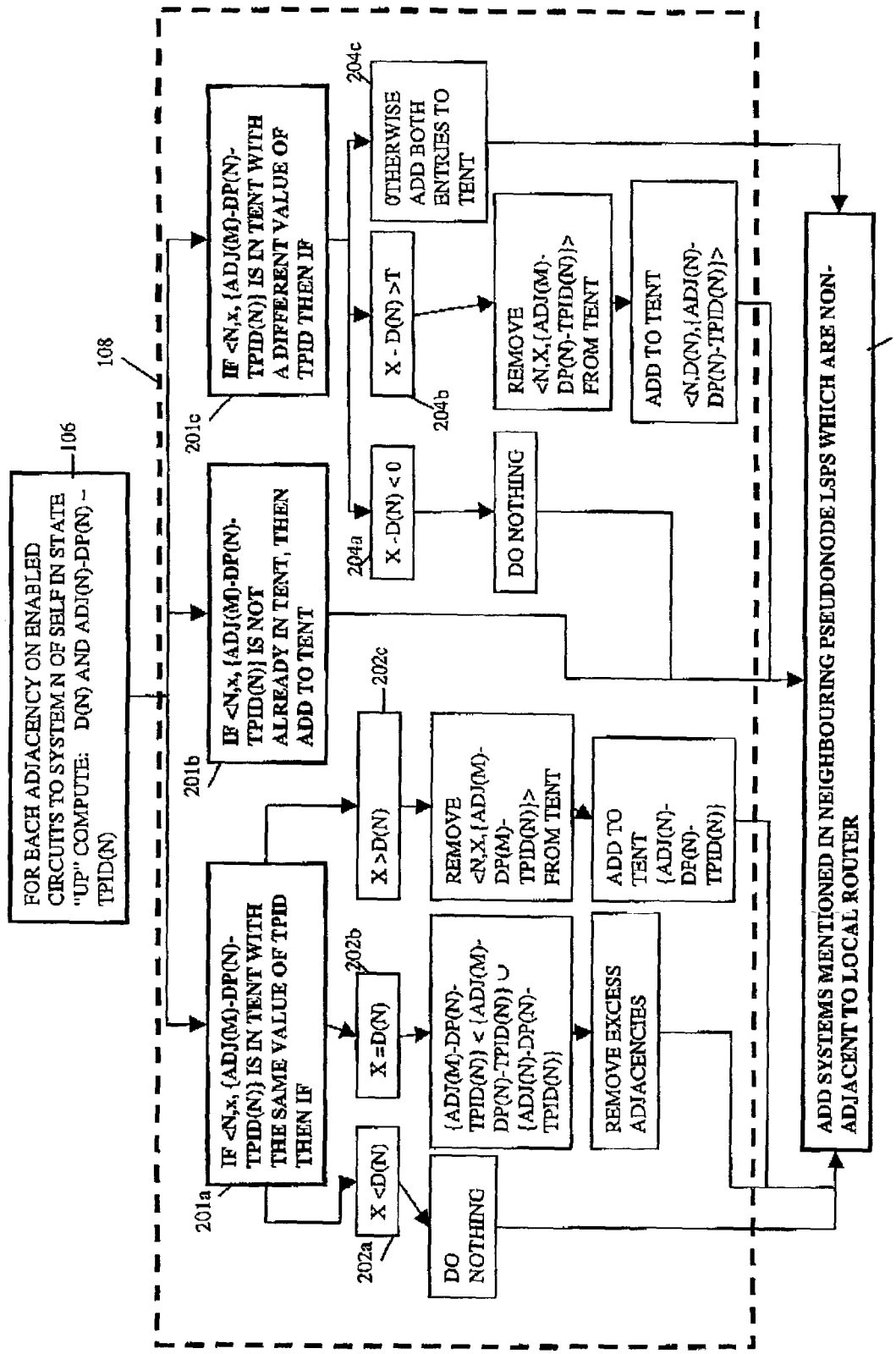

Step 108: Update the TENT database, as is shown in more detail in FIG. 24B, As FIG. 24B shows, the TENT database is updated as follows: —

Step 201a: If a triple <N,x,{Adj(M)-DP(N)-TPID(N)}> is in TENT with the same value of TPID as the entry being considered, then perform:

Step 202b: If x=d(N), replace the entry {Adj(M)-DP(N)-TPID(N)} in tent with an entry {Adj(M)-DP(N)-TPID(N)}∪{Adj(N)-DP(N)-TPID(N)}, where M represents the next adjacency.

If N is a router or an OSI End System entry, and there are now more adjacencies in {Adj(M)} than maximumPathSplits, then remove excess adjacencies as described in Clause 7.2.7 of RFC 1195, If N is an IP Reachability Entry, then excess adjacencies may be removed as desired. This will not effect the correctness of routing, but may eliminate the determinism for IP routes (i.e., IP packets still follow optimum routes within an area, but where multiple equally good routes exist, will not necessarily follow precisely the route that any one particular router would have anticipated).

Step 202a: It x<d(N) and the values of TPID(N) are the same, do nothing.

Step 202c: If x>d(N) and the values of TPID(N) are the same, remove <N,x,{Adj(M)-DP(M)-TPID(N)}> from TENT and add the triple <N,d(N),{Adj(N)-DP(N),TPID(N)}>.

Step 201c: If a triple <N,x,{Adj(M)-DP(N)-TPID(N)}> is in TENT with a different value of TPID to the entry being considered, then:

Step 204a: If (x-d(N))<0, do nothing;

Step 204b: If (x-d(N))>T, then remove <N,x,{Adj(M)-DP(N)-TPID(N)}> from TENT and add the triple <N,d(N),{Adj(N)-DP(N)-TPID(N)}>.

Step 204c: Otherwise, add both entries to the TENT database. This entry is treated as a separate entry to the existing one as although each entry has the destination "N", they each have a different TPID value.

Step 201b: If no triple <N,x,{Adj(M)-DP(M),TPID(M)}> is in TENT, then add <N,d(N),{Adj(N)-DP(N),TPID(N)}> to TENT.

Step 110, Referring back now to FIG. 24A, systems are added to which the local router does not have adjacencies, but which are mentioned in neighbouring pseudonode LSPs. The adjacency for such systems is set to that of the designated router. This does not include IP reachability entries from neighbouring pseudonode LSPs. In particular, the pseudonode LSPs do not include IP reachability entries.

Step 112: For all broadcast circuits in state "On", find the pseudonode LSP for that circuit (specifically, the LSP with number zero and with the first 7 octets of LSPID equal to LnCircuitID for that circuit, where n is 1 (for level 1 routing) or 2 (level 2 routing)).

Step 114: If it is present, for all the neighbours N reported in all the LSPs of this pseudonode which do not exist in TENT add an entry <N,d(N),{Adj(N)-DP(N)-TPID(N)}> to TENT, where:

d(N)=metric.k of the circuit, and Adj(N)=the adjacency number of the adjacency to the homogeneous router.

Step 116a,b: Consider whether the TENT database is empty or not as per STEP B (see FIG. 24A and FIG. 24E).

Figure 24C:
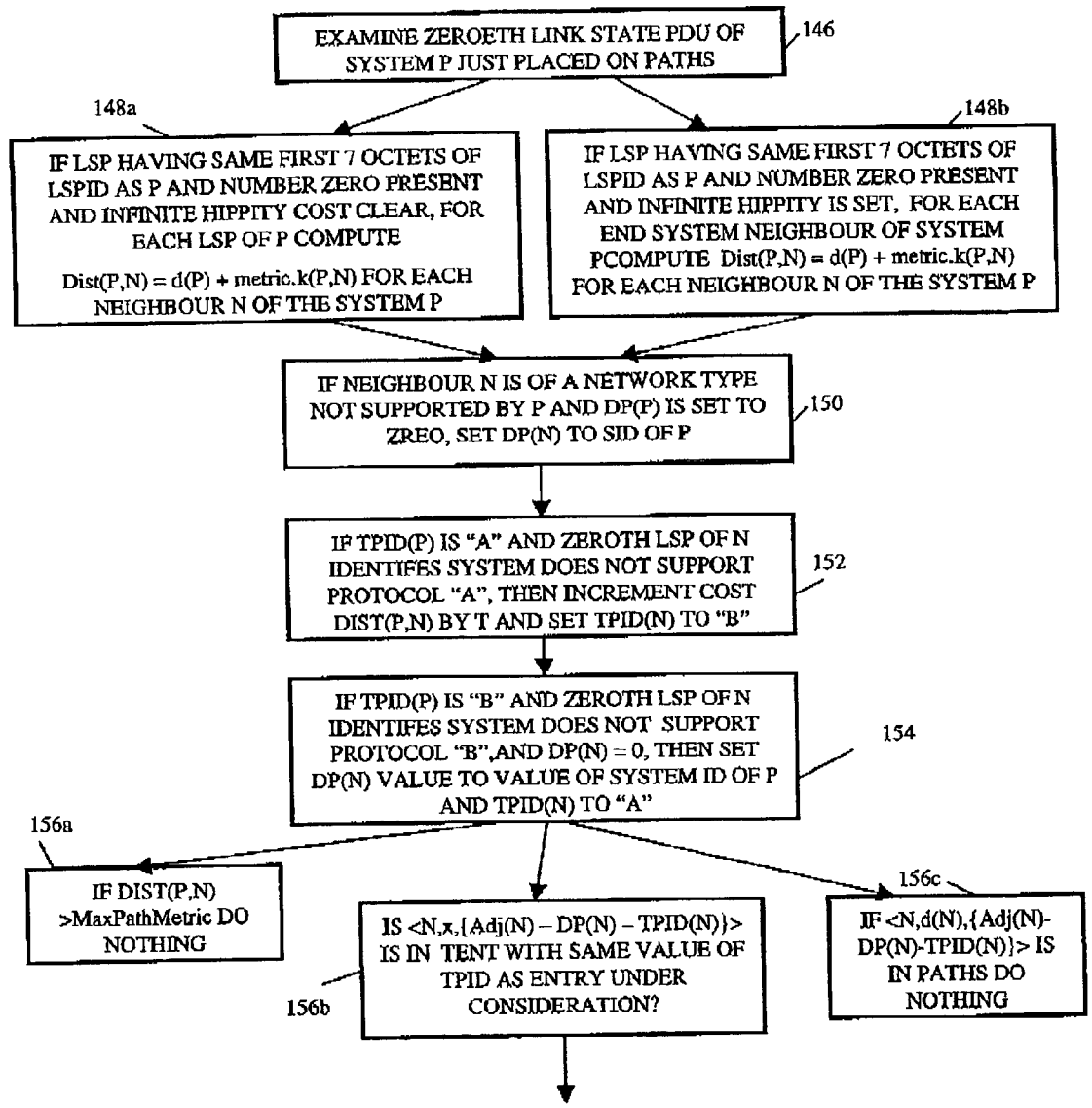

Referring now to FIG. 24C,

Step 146: Examine the zeroeth link state PDU of P, the system just placed on PATHS (i.e., the LSP with the same first 7 octets of LSPID as P, and LSP number zero).

Step 148a: If this LSP is present, and the "Infinite Hippity Cost" bit is clear, then for each LSP of P (i.e., all LSPs with the same first 7 octets of LSPID and P, irrespective of the value of LSP number) compute:

$dist(P,N)=d(P)+metric.k(P,N)$ for each neighbour N (both End System and router) of the system P.

Step 148b: If the "Infinite Hippity Cost" bit is set, only consider the End System neighbours of the system P.

Note that the End Systems neighbours of the system P includes IP reachable address entries included in the LSPs from system P. Here, d(P) is the second element of the triple $<P,d(P),\{Adj(P)-DP(P)-TPID(P)\}>$ and metric.k(P,N) is the cost of the link from P to N as reported in P's link state PDU.

Step 152: If the TPID(P) is "A", and the zeroeth LSP of N if this identifies that this system does not support protocol A, then increment the cost of N i.e. dist(P,N) by T, and set the TPID(N) value to "B"

Step 154: If the TPID(P) is "B" and the zeroeth LSP of N identifies that this system supports ONLY protocol A, and the DP(N) value of this triplet is zero then set the DP(N) value to be the systemID of P and the TPID(N) to be A.

Step 156a: If dist(P,N)>MaxPathMetric, then do nothing.

Step 156b: If a triple <N,x,{Adj(N)-DP(N)-TPID(N)}> is in TENT with the same value of TPID as the entry being considered, then, referring now to FIG. 24D, proceed via steps 158a,b,c etc.

Step 156*c*: If <N,d(N),{Adj(N)-DP(N)TPID(N)}> is in PATHS, then do nothing.

Note: d(N) must be less than dist(P,N), or else N would not have been put into PATHS. An additional sanity check may be done here to ensure that d(N) is in fact less than dist(P,N).

Step 156*d*: Referring now to FIG. 24E, if a triple <N,x,{Adj (M)-DP(N)-TPID(N)}> is in TENT with a different value of TPID to the entry being considered, then go to step 162*a* etc.

Figure 24D:
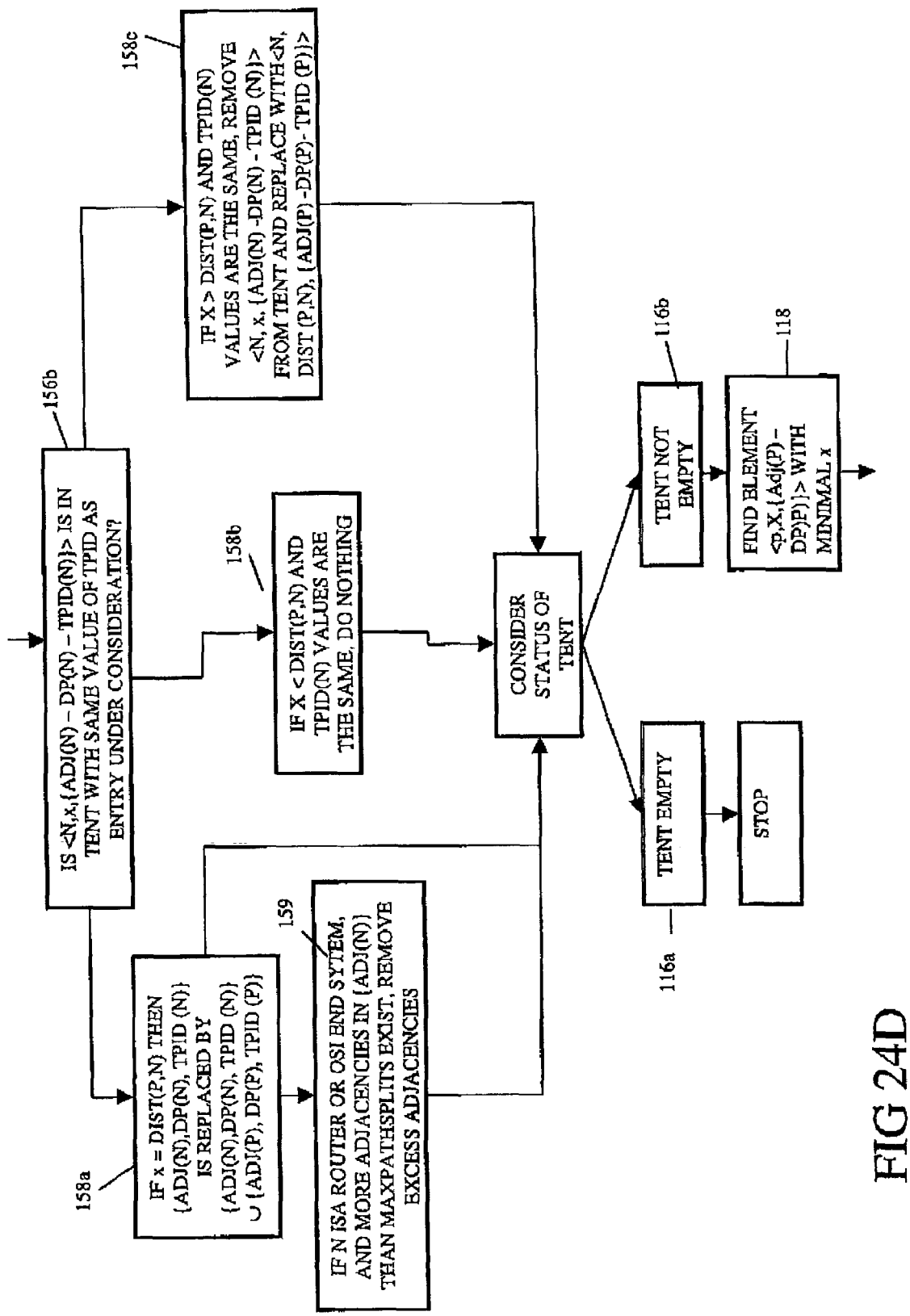
Figure 24E:
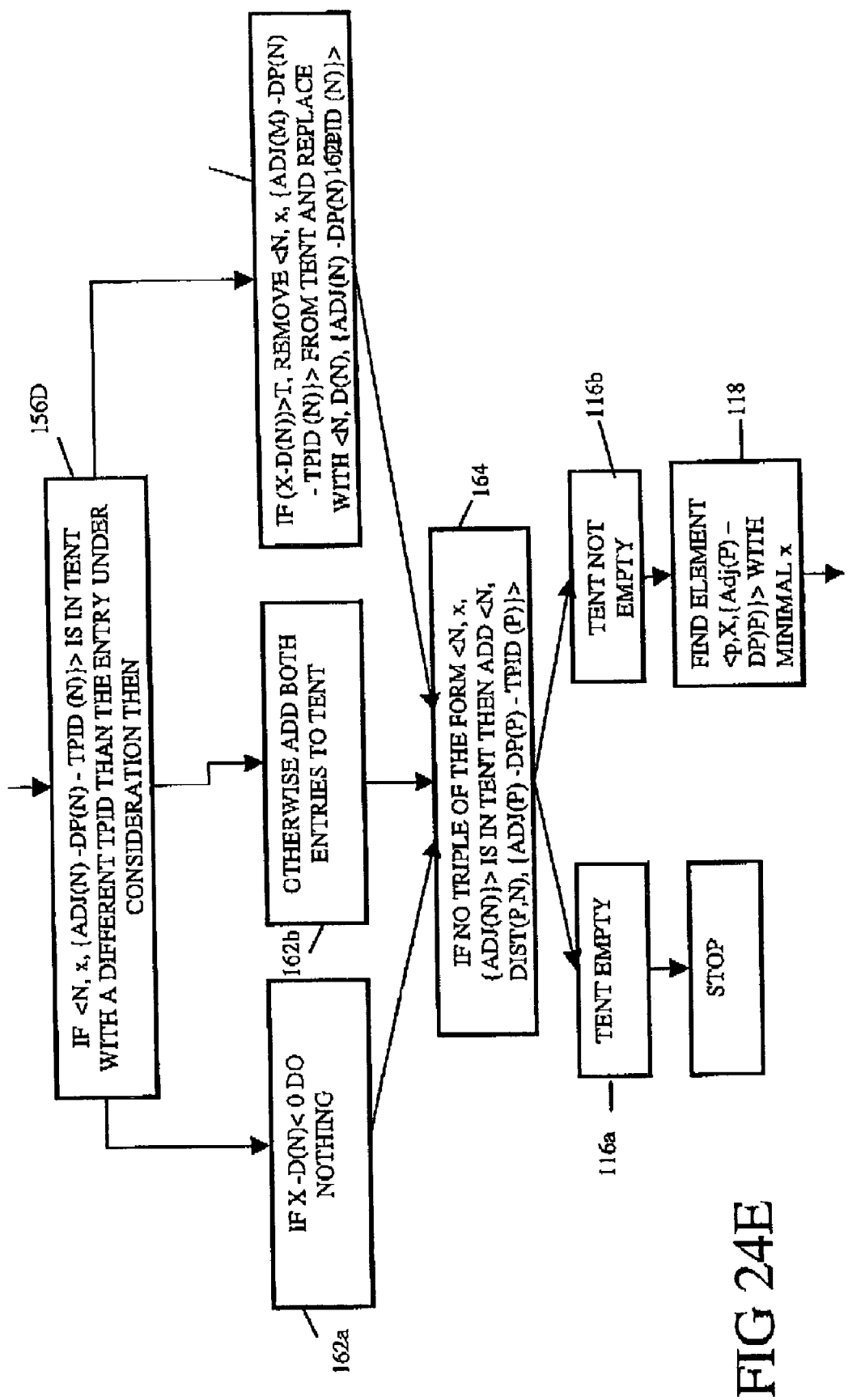

Proceeding on from Step 156*b*, and referring now to FIG. 24D,

Step 158*a*: If x=dist(P,N), then {Adj(N),DP(N), TPID(N)}<--{Adj(N)-DP(N)-TPID(N)}∪{Adj(P)-DP(P)-TPID(P)}.

Note that even it the value of Adj(N) is equal to the value Adj(P) but the corresponding values of DP(P) and DP(N) are different then this should be treated as a different adjacency and will represent a different path to the destination.

Step 159: If N is a router or an OSI end system, and there are now more adjacencies in {Adj(N)} than maximumPath Splits, then remove excess adjacencies, as described in clause 7.2.7 of RFC1153. For IP Reachability Entries, excess adjacencies may be removed as desired. This will not effect the correctness of routing, but may eliminate the determinism for IP routes (i.e., IP packets will still follow optimum routes within an area, but where multiple equally good routes exist, will not necessarily follow precisely the route that any one particular router would have anticipated).

Step 158*b*: If x<dist(P,N), and the values of TPID(N) are the same, do nothing.

Step 158*c*: If x>dist(P,N), and the values of TPID(N) are the same remove <N,x,{Adj(N)-DP(N)-TPID(N)}> from TENT, and add <N,dist(P,N),{Adj(P)-DP(P)TPID(N)}> Consider the status of TENT (step B) and, Step 116*a*: If TENT is empty, stop.

Step 116*b*: Else:

Step 118: Referring now to FIG. 24E, find the element <P,x,{Adj(P)-DP(P)}>, with minimal x—see below.

Continuing on from Step 156*d*, and referring now to FIG. 24E,

Step 162*a*: If (x−d(N))<0, then do nothing;

Step 162*c*: If (x−d(N))>T remove <N,x,{Adj(M)-DP(N)-TPID(N)}> from TENT and add the triple <N,d(N),{Adj (N)-DP(N)-TPID(N)}>.

Step 162*b*: Otherwise add both entries to the TENT database.

(Note that this entry is treated as a separate entry to the existing one as although each entry has the destination "N", they each have a different NPID value)

Step 164: If no triple <N,x,{Adj(N)}> is in TENT, then add <N,dist(P,N),{Adj(P)DP(P)TPID(N)}> to TENT.

Step 116*a*: It TENT is empty, stop.

Step 116*b*: Else:

Step 118: Referring now to FIG. 24E, find the element <P,x,{Adj(P)-DP(P)}>, with minimal x as follows:

Step 120: It an element <*,tentlength,*> remains in TENT in the list for tentlength, choose that element (steps 122, 124). It there are more than one elements in the list for tentlength, choose one of the elements (if any) for a system which is a pseudonode in preference to one for a non-pseudonode (Steps 126, 128). If there are no more elements in the list for tentlength, increment tentlength (Step 130) and repeat from Step 116*a*.

Figure 24F:
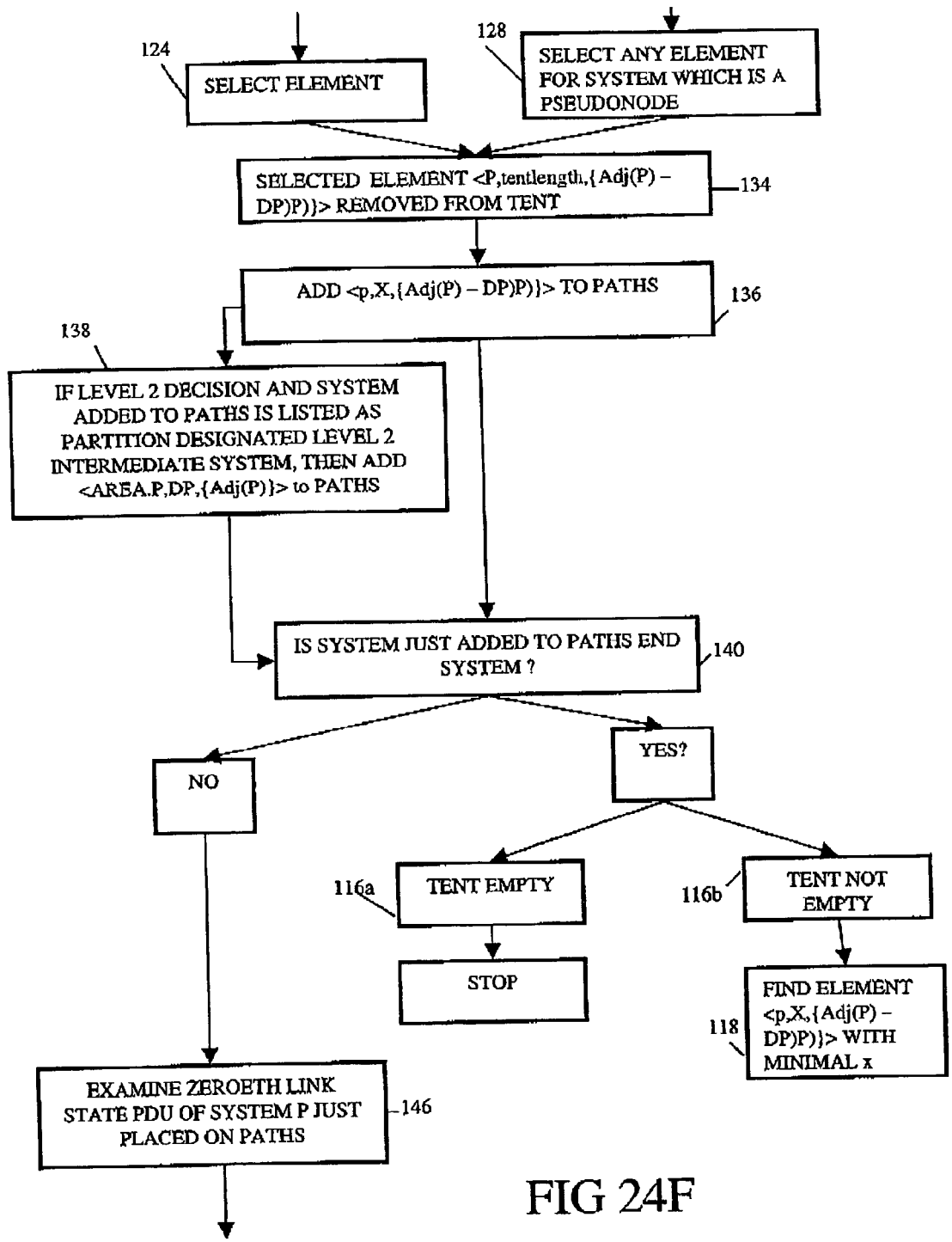
Figure 24G:
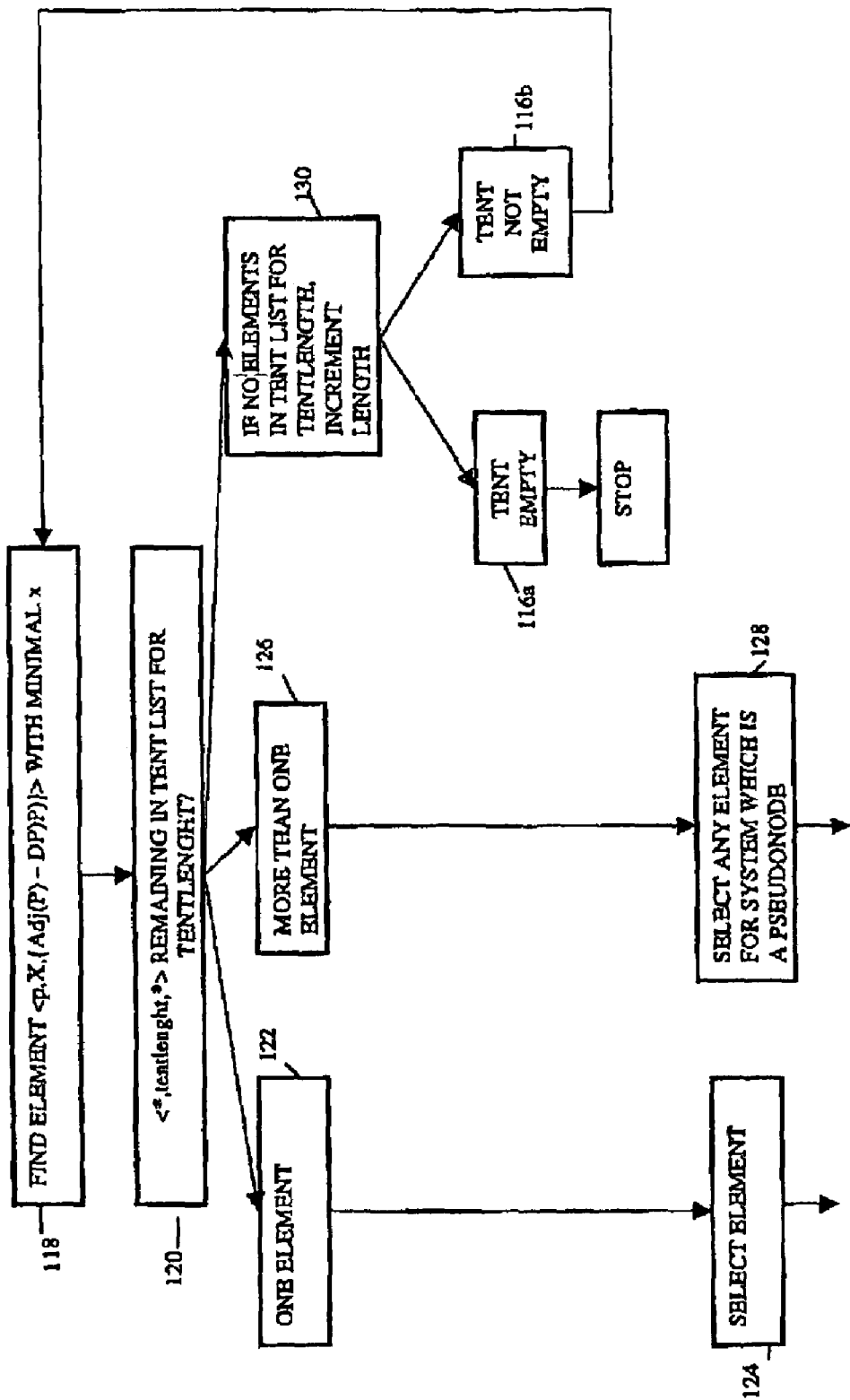

Referring now to FIG. 24F, once an element has been selected via either Step 124 or Step 128, Step 134: Remove <P,tentlength,{Adj(P)-DP(P)-TPID}> from TENT.

Step 136: Add <P,d(P),{Adj(P)-DP(P)-TPID}> to PATHS.

Step 138: If this is the Level 2 Decision Process running, and the system just added to PATHS listed itself as Partition Designated Level 2 Intermediate system, then additionally add <AREA.P,d(P),{Adj(P)}> to PATHS, where AREA.P is the Network Entity Title of the other end of the Virtual Link, obtained by taking the first AREA listed in P's LSP and appending P's ID.

Step 140: If the system just added to PATHS was an end system, go to step 116*b*. Else go to Step 146.

Here, in the level 2 context, the "End Systems" are the set of Reachable Address Prefixes (for OSI), the set of Area Addresses with zero cost (again, for OSI), plus the set of IP reachability entries (including both internal and external reachability entries).

It will be seen from Step 201*a* that the modified SPF algorithm of the present invention, like that of U.S. patent application Ser. Nos. 10/039,432, and 10/032,417 may be used in networks where one or more of the nodes are split stack nodes. If a neighbouring node N, or adjacency, supports a protocol set not supported by node P and if the value of DP(P) is equal to zero (i.e. P is not a dual router) then P is assumed to be a split stack node and DP(N) should be set to the SID of node P.

Encapsulation Support

The above description refers to an algorithm in which it is assumed that a heterogeneous router (or equivalently a dual router as only two protocols are under consideration from an encapsulation point of view) is capable of encapsulating and de-encapsulating packets of both supported protocols, A and B. If the algorithm is to be used in a network containing one or more dual routers which are not supporting, but which are not capable of encapsulating and de-encapsulating, packets of both supported protocols then certain changes can be made to the algorithm.

By assigning a suitable identifier indicating support for the encapsulation/de-encapsulation function, it is possible to identify not only whether a dual router is able to support one or more protocols, but also to identify explicitly its ability to encapsulate/de-encapsulate the protocols it supports.

For example, in U.S. patent application Ser. Nos. 10/039, 432, and 10/032,417, the entries in both the PATHS and TENT can be updated to contain instead of one DP(N) entry, two entries one for each protocol. For example, an entry to a destination N could have the following format: —

<N,d(N),{Adj(N)-ADP(N)-BDP(N),[TPID]}>

Where:

ADP(N)—Is the next router along the PATH to N capable of encapsulating and de-encapsulating packets of protocol A in packets of protocol B.

BDP(N)—Is the next router along the PATH to N capable of encapsulating and de-encapsulating packets of protocol B in packets of protocol A.

Secondly, when moving an entry from the TENT database to the PATHS database instead of examining the "protocols supported" field of an LSP, one or more fields may be examined which indicate the encapsulation capability, for example—the "Encapsulation Capability field(s)" (a name which may change) could be examined for each protocol. If the value of this field in the LSP indicates that this router is capable of encapsulating and de-encapsulating protocol A over protocol B packets and the value of ADP(N) is set to the NULL indicator then the value of ADP(N) should be set to the SID of this router. If the value of this field in the LSP indicates that this router is capable of encapsulating and de-encapsulating protocol B over protocol A packets and the value of BDP(N) is set to the NULL indicator then the value of BDP(N) should be set to the SID of this router. Other behavioural characteristics of the algorithm are not adjusted.

U.S. patent application Ser. Nos. 10/039,432, and 10/032, 417, and the present invention describe algorithms which utilise a new type-line value (TLV) which enables both an IP over OSI dual router and a OSI over IP dual router to be located instead of simply looking for dual routers per se. Moreover, U.S. Ser. No. 10/039,432 and the present invention examine the encapsulation capability of dual routers. The present invention further examines the cost of the encapsulation process over a path to determine which nodes along a path (if any) provide the optimum auto-tunnelling points in terms of obtaining an optimum path between a source and a destination which provides the lowest overall metric cost regarding auto-tunnelling along the path.

Thus in co-pending U.S. patent application Ser. Nos. 10/039,432 instead of an "adjacency-dual protocol router" pair associated with each entry in the PATHS table, an "adjacency-OSIoverIP dual protocol router-IPoverOSI dual protocol router" entry is associated (Note, that in most cases the OSIoverIP and IPoverOSI DP routers will be the same.)

As an example, in embodiments of the invention where the encapsulation capability needs to be indicated, the TLV (or equivalently code-length value) could comprise the following: —

Code=16(decimal) (meaning "encapsulation/deencapsulation capability" field);

Length=length of value field

Value: —

1st byte=1

This byte is for future versions or options or uses, but can be set to 1 for this initial version. Bytes 2,3,4 are a triplet of the form: — encapsulation_mode=47 for GRE (Generic Routing Encapsulation) as per RFC 702, 2784, 3147)

inner_protocol=the NLPID of the protocol that can be received in encapsulation form outer_protocol=the NLPID of the protocol that can be used to transport the encapsulated packet A second, third, fourth and so on triplet can then be added as necessary The TLV can be expanded for other uses in the future by two mechanisms. Firstly, by using a number different to 47, in which case the triplet need not even be a triplet anymore. For example, it a sub-feature that needs 5 bytes is defined it can be given a number of 35, for example. It is also envisaged that IP over IP could use the IP protocol number for IP over IP encapsulation (4) for example. Secondly, by using a new first byte, other than 1, in which case all previous definitions are invalid and we can start again, without needing a new TLV number.

In such an example, in a typical dual NE the TLV could be included in LSPs (level-1 and level-2) and could comprise: —

16: the code

7: the value length (in this example)

1: initial version/option

47: next two bytes are a supported GRE mode

129: IPI for CLNP from ISO 9577 as inner

204: IPI for IPv4 from ISO 9577 as outer

47: next two bytes are a supported GRE mode

204: IPI for IPv4 from ISO 9577 as inner

129: IPI for CLNP from ISO 9577 as outer

In this case the TLV indicates that the IS can receive CLNPoverIP (RFC 1702) in the first triplet and IPoverCLNS (RFC 3147) in the second As an example, it is possible for an IP interface to not be configured on a card and yet the card advertises itself as a dual router. In this instance, if an explicit encapsulation capability field is not used, an error event may occur as an IP address cannot be determined for the card and therefore packets cannot be encapsulated in IP and sent to the card.

Advantageously, it is possible to prevent such situations occurring using the invention in at least two ways. For example, using the above embodiment the PATHS triplets can be modified to store two systems IDs. The first ID in this embodiment is able to do IPoverCLNS termination, and is used in the IP forwarding table, effectively indicating "encapsulate and send here". The second ID indicates the capability to do CLNPoverIP, and this ID is put into the OSI forwarding table, effectively indicating "encapsulate and send here". Although the two system IDs should normally be the same they need not always be. Alternatively, one can simply use the algorithm which determines routers able to support both protocols and constrain the search for the next dual router such that the next dual router must have a TLV with both triplets in it (e.g., IPoverCLNS and CLNPoverIP). For clarity, as is known to those skilled in the art, the equivalent also applies to OSIoverIP and IPoverOSI embodiments of the invention. If more than one entry in TENT shares the same d(N), then any suitable rule may be applied to select one of them.

This has numerous advantageous features which are apparent to the person skilled in the art.

The invention claimed is:

1. A method of routing data packets in a heterogeneous network from a first network node, the method comprising the steps of:

creating entries in at least one database associated with said first network node, each entry relating to at least one respective path from said first network node to a respective destination node in the network;

determining, when creating an entry, if a network node located along said at least one respective path is a heterogeneous network node;

associating with each created entry, additional information comprising at least one heterogeneous characteristic of said heterogeneous network node, said at least one heterogeneous characteristic comprising a metric cost for encapsulating data packets provided in a form compliant with a first protocol set into a form compliant with a second protocol set;

creating subsequent entries in respect of paths to other network nodes;

associating said additional information with said subsequent entries; and determining an optimum path along which said data packets are to be routed in dependence on said additional information.

2. A method as claimed in claim 1, wherein in the step of associating with each created entry, at least one heterogeneous characteristic comprises an additional field for a transport protocol indicator (TPID field) in said at least one database.

3. A method as claimed in claim 1, wherein in the step of associating with each created entry, at least one heterogeneous characteristic comprises an indicator that terminating tunnelling at said heterogeneous network node provides the least number of encapsulations along said at least one respective path.

4. A method as claimed in claim 1, wherein in the step of associating with each created entry, at least one heterogeneous characteristic comprises the encapsulation capability of the heterogeneous network node between a first protocol set and a second protocol set.

5. A method of routing data packets in a network as claimed in claim 1, wherein at least one characteristic identifies a heterogeneous network node as an optimum heterogeneous network node providing the lowest number of encapsulations/de-encapsulations along said at least one path to the destination node.

6. A method of routing data packets as claimed in claim 1, wherein said at least one database associated with said first network node comprises a first database for holding entries in respect of tentative paths to network nodes, and a second database for holding entries in respect of shortest paths to network nodes, the method further comprising the steps of:
deriving at least some of the entries in said second database from respective entries in said first database, wherein at least one characteristic indicates the cost of sending a data packet from the first node to the destination node of the entry, and
creating an entry in said second database in respect of the entry in the first database having the lowest cost indicator.

7. A method of routing data packets as claimed in claim 1, wherein said at least one database associated with said first network node comprises a first database for holding entries in respect of tentative paths to network nodes, and a second database for holding entries in respect of shortest paths to network nodes, the method further comprising the steps of:
deriving at least some of the entries in said second database from respective entries in said first database, wherein the additional information associated with each entry in said first database comprises an indication of the cost of sending a data packet from the first node to the destination node of the entry in accordance with a first protocol, and
creating an entry in said second database in respect of each entry in said first database having additional information indicating a different protocol set but having the same cost indicator.

8. A method of routing data packets as claimed in claim 1, wherein said at least one database associated with said first network node comprises a first database for holding entries in respect of tentative paths to network nodes, and a second database for holding entries in respect of shortest paths to network nodes, the method further comprising the steps of:
deriving at least some of the entries in said second database from respective entries in said first database, wherein the additional information associated with each entry in said first database comprises an indication of the cost of sending a data packet from the first node to the destination node of the entry in accordance with a first protocol, and
discarding an entry in said second database if its cost exceeds a tunnelling cost where at least one other entry exists to the same destination with the same protocol.

9. A method as claimed in claim 1, in which each database entry relating to at least one path to a destination node includes, in respect of the, or each path, a respective multi-protocol field for carrying said identifying information, wherein the, or each, multi-protocol field is set to identify a heterogeneous router in the respective path, or to indicate that no known heterogeneous router exists in said respective path.

10. A method as claimed in any one of claims 6, 7, or 8, wherein, when creating an entry in said first database in respect of at least one path to a destination node, the apparatus is arranged to determine if the destination node is a heterogeneous network node supporting at least two protocol sets only if at least one of a, or each, multi-protocol field is set to indicate that no other known heterogeneous network node exists in the respective path.

11. A method as claimed in claim 9, whereupon determining that said destination node supports is a heterogeneous network node supporting at least two protocol sets, the apparatus is arranged to set the respective multi-protocol field to identify said destination node.

12. A method of routing data packets in a heterogeneous network from a first network node, the method comprising the steps of:
creating entries in at least one database associated with said first network node, each entry relating to at least one respective path from said first network node to a respective destination node in the network;
determining, when creating an entry, if a network node located along said at least one path is a heterogeneous network node;
associating with each heterogeneous network node an entry identifying at least one characteristic of said heterogeneous network node;
creating subsequent entries in respect of paths to other network nodes;
associating said heterogeneous characteristic information with said subsequent entries; and
determining an optimum path along which said data packets are to be routed in dependence on said heterogeneous characteristic information, wherein at least one characteristic of said heterogeneous network node indicates an encapsulation cost for encapsulating data packets provided in accordance with a first protocol set into a second protocol set.

13. A method as claimed in claim 12, wherein the encapsulation cost is predetermined for each heterogeneous node in the network.

14. Apparatus arranged to implement a method of routing data packets in a heterogeneous network from a first network node, the apparatus comprising:
means arranged to create entries in at least one database associated with said first network node, each entry relating to at least one respective path from said first network node to a respective destination node in the network,
means arranged to determine, when creating an entry, if a network node located along said at least one path is a heterogeneous network node, means arranged to associate with each heterogeneous network node an entry identifying at least one characteristic of said heterogeneous network node, and means arranged to create subsequent entries in respect of paths to other network nodes, and means arranged to associate said heterogeneous characteristic information with said subsequent entries by determining an optimum path along which said data packets are to be routed in dependence on said heterogeneous characteristic information, wherein at least one characteristic of said heterogeneous network node indicates an encapsulation cost for encapsulating data packets providing in accordance with a first protocol set into a second protocol set.

15. Apparatus as claimed in claim 14, wherein said characteristic information identifies an optimum heterogeneous router providing the least number of encapsulations/de-encapsulations of data packets along said at least one path to the destination node.

16. An apparatus as claimed in claim 14, said first network node includes a first database for holding entries in respect of tentative paths to network nodes, and a second database for holding entries in respect of shortest paths to network nodes, the apparatus being arranged to derive at least some of the entries in said second database from respective entries in said first database.

17. A network node comprising an apparatus as claimed in claim 14.

18. A heterogeneous network comprising a plurality of network nodes, at least one of said plurality of network nodes comprising an apparatus as claimed in claim 17.

19. A computer program product comprising computer useable instructions for causing a computer to implement the method as claimed in claim 1 or 2.

20. Apparatus arranged to implement a method of routing data packets in a heterogeneous network from a first network node, the apparatus comprising:

a processing component arranged to create entries in at least one database associated with said first network node, each entry relating to at least one respective path from said first network node to a respective destination node in the network, a processing component arranged to determine, when creating an entry, if a network node located along said at least one path is a heterogeneous network node, a processing component arranged to associate with each heterogeneous network node an entry identifying at least one characteristic of said heterogeneous network node, and a processing component arranged to create subsequent entries in respect of paths to other network nodes, and a processing component arranged to associate said heterogeneous characteristic information with said subsequent entries by determining an optimum path along which said data packets are to be routed in dependence on said heterogeneous characteristic information, wherein at least one characteristic of said heterogeneous network node indicates an encapsulation cost for encapsulating data packets providing in accordance with a first protocol set into a second protocol set.

* * * * *